(12) United States Patent
Lim et al.

(10) Patent No.: US 10,183,680 B2
(45) Date of Patent: Jan. 22, 2019

(54) MOBILE TERMINAL AND METHOD FOR CONTROLLING APPLICATION FOR VEHICLE

(71) Applicant: Samsung Electronics Co., Ltd., Suwon-si, Gyeonggi-do (KR)

(72) Inventors: Kyung Soo Lim, Yongin-si (KR); Hyuk Kang, Yongin-si (KR); Sang Don Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 14/711,327

(22) Filed: May 13, 2015

(65) Prior Publication Data
US 2015/0329121 A1    Nov. 19, 2015

(30) Foreign Application Priority Data
May 13, 2014    (KR) .................... 10-2014-0057354

(51) Int. Cl.
| | |
|---|---|
| *B60W 50/08* | (2012.01) |
| *H04W 88/02* | (2009.01) |
| *G05B 15/02* | (2006.01) |
| *G06F 9/00* | (2006.01) |
| *H04W 4/02* | (2018.01) |
| *H04W 4/04* | (2009.01) |
| *H04M 1/725* | (2006.01) |
| *G07C 9/00* | (2006.01) |
| *H04M 1/60* | (2006.01) |

(52) U.S. Cl.
CPC ............ *B60W 50/08* (2013.01); *G05B 15/02* (2013.01); *G06F 9/00* (2013.01); *G07C 9/00309* (2013.01); *H04M 1/7253* (2013.01); *H04W 4/027* (2013.01); *H04W 4/046* (2013.01); *H04W 88/02* (2013.01); *G07C 2009/00769* (2013.01); *G07C 2209/62* (2013.01); *G07C 2209/63* (2013.01); *H04M 1/6091* (2013.01); *H04M 1/72533* (2013.01); *H04M 2250/12* (2013.01)

(58) Field of Classification Search
None
See application file for complete search history.

(56) References Cited

U.S. PATENT DOCUMENTS 6,430,498 B1 *   8/2002   Maruyama ............. G01C 21/26
                                                        340/980
6,736,009 B1 *   5/2004   Schwabe ................ G01P 3/486
                                                        324/164

(Continued)

FOREIGN PATENT DOCUMENTS

WO    WO 2009104131 A1 *  8/2009    ............... H04B 5/02

*Primary Examiner* — Jelani A Smith
*Assistant Examiner* — Paul A Castro
(74) *Attorney, Agent, or Firm* — Jefferson IP Law, LLP

(57) ABSTRACT

A mobile terminal and a method for controlling an application for a vehicle are provided. The mobile terminal includes an acceleration sensor configured to detect a motion of the mobile terminal, a magnetic sensor configured to detect a magnetic field, a first control unit configured to determine whether the detected motion and the detected magnetic field correspond to a pre-defined condition of entering a vehicle, and output a signal according to the determination, and a second control unit configured to execute the vehicle application based on the signal received from the first control unit.

18 Claims, 27 Drawing Sheets

(56) References Cited

U.S. PATENT DOCUMENTS

| | | | |
|---|---|---|---|
| 7,096,030 B2 | 8/2006 | Huomo | |
| 2004/0203863 A1 | 10/2004 | Huomo | |
| 2007/0139216 A1* | 6/2007 | Breed | G08C 17/00 |
| | | | 340/13.24 |
| 2011/0070829 A1* | 3/2011 | Griffin | H04B 5/02 |
| | | | 455/41.1 |
| 2014/0106710 A1* | 4/2014 | Rodriguez | H04M 1/7253 |
| | | | 455/411 |
| 2015/0365806 A1* | 12/2015 | Parviainen | G06F 3/0346 |
| | | | 455/457 |
| 2017/0014165 A1* | 1/2017 | Guetlin | A61B 17/1757 |

\* cited by examiner

MOBILE TERMINAL AND METHOD FOR CONTROLLING APPLICATION FOR VEHICLE

CROSS-REFERENCE TO RELATED APPLICATION(S)

This application claims the benefit under 35 U.S.C. § 119(a) of a Korean patent application filed on May 13, 2014 in the Korean Intellectual Property Office and assigned Serial number 10-2014-0057354, the entire disclosure of which is hereby incorporated by reference.

TECHNICAL FIELD

The present disclosure relates to a mobile terminal and a method for controlling an application for a vehicle.

BACKGROUND

In general, a vehicle supports communication between a vehicle network and various information and communication devices such as a vehicle diagnosis device, a personal digital assistant (PDA), a laptop computer, and the like. A vehicle may connect an information and communication device to an electronic control unit (ECU) constituting a vehicle network through a communication protocol such as Controller Area Network (CAN) (ISO 1158), Universal Asynchronous Receiver/Transmitter (UART), Society of Automotive Engineers (SAE) J1850, or the like. In more detail, the vehicle may be directly connected to the information and communication device via a wired/wireless network using a vehicle gateway included in the vehicle, or may be connected to the information and communication device on a peer-to-peer (P2P) basis through Ethernet, a switch, a wireless local area network (WLAN), an access point (AP), or the like.

Furthermore, as various wireless communication technologies such as Universal Mobile Telecommunications System (UMTS), Code Division Multiple Access (CDMA), WLAN, wireless personal area network (WPAN), Wi-Fi, Bluetooth, or the like are developed, information and communication devices may communicate with vehicle networks by virtue of such wireless communication technologies.

Accordingly, various applications for a vehicle are developed to provide vehicle services by associating a vehicle with a mobile terminal. For example, technologies are developed to associate a vehicle with a mobile terminal so that a driver may use a service such as location information provision, voice navigation, making a call, message transmission, music playback, or the like through an application for a vehicle installed in the mobile terminal while driving a vehicle.

In general, a vehicle application for providing a vehicle-related service by associating a vehicle with a mobile terminal is run once the mobile terminal is connected to a car kit of the vehicle while the vehicle is in an ignition-on state. However, since the car kit is booted after the vehicle is started, it takes a relatively long time to establish a communication connection between the mobile terminal and the vehicle. Moreover, while the vehicle is in an ignition-off state, a user should manually run the vehicle application of the mobile terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile terminal for automatically executing a vehicle application if specified conditions are satisfied even if the ignition of a vehicle is turned off, and a method for controlling the vehicle application.

Another aspect of the present disclosure is to provide a mobile terminal for automatically monitoring entry of a user into a vehicle or alighting of the user from the vehicle based on information detected by sensors provided to the mobile terminal and for automatically controlling execution and/or termination of a vehicle application, and a method for controlling the vehicle application.

Another aspect of the present disclosure is to provide a mobile terminal for confirming an in-vehicle position of a user based on information detected by sensors provided to the mobile terminal and for providing a specific function corresponding to the in-vehicle position of the user, and a method for controlling the vehicle application.

In accordance with an aspect of the present disclosure, a mobile terminal is provided. The mobile terminal includes an acceleration sensor configured to detect a motion of the mobile terminal, a magnetic sensor configured to detect a magnetic field, a first control unit configured to determine whether the detected motion and the detected magnetic field correspond to a pre-defined condition of entering a vehicle, and output a signal according to the determination, and a second control unit configured to execute the vehicle application based on the signal received from the first control unit.

In accordance with another aspect of the present disclosure, a mobile terminal is provided. The mobile terminal includes an acceleration sensor configured to detect a motion of the mobile terminal, a magnetic sensor configured to detect a magnetic field, a first control unit configured to determine whether the detected motion and the detected magnetic field correspond to a predefined condition of entering a vehicle, and generate a signal according to the determination, and a second control unit configured to perform at least one of execution of a first function and restriction of a second function predefined for the user based on the signal received from the first control unit.

In accordance with another aspect of the present disclosure, a mobile terminal is provided. The mobile terminal includes a magnetic sensor configured to detect a motion of the mobile terminal, an acceleration sensor configured to detect a magnetic field, a first control unit configured to determine whether the detected motion and the detected magnetic field correspond to a predefined condition of alighting from a vehicle while the vehicle application is executed, and generate a signal according to the determination, and a second control unit configured to terminate execution of the vehicle application based on the signal received from the first control unit.

In accordance with another aspect of the present disclosure, a mobile terminal is provided. The mobile terminal includes an acceleration sensor, a magnetic sensor, a first control unit configured to determine whether a user enters or alights from a vehicle based on a motion pattern of entering or alighting from the vehicle detected by the acceleration sensor and a magnetic field detected by the magnetic sensor, and a second control unit configured to execute the vehicle application if the user enters the vehicle and terminate execution of the vehicle application if the user alights from the vehicle.

In accordance with another aspect of the present disclosure, a method for controlling a vehicle application is provided. The method includes determining, by a first control unit, that a predefined condition of entering a vehicle is satisfied based on a motion pattern of entering the vehicle detected by an acceleration sensor and a magnetic field detected by a magnetic sensor, outputting, by the first control unit, a signal according to the determination, and executing, by a second control unit, the vehicle application based on the signal received from the first control unit.

In accordance with another aspect of the present disclosure, a method for controlling a vehicle application is provided. The method includes determining, by a first control unit, a state of alighting of a user from a vehicle based on a motion pattern of alighting from the vehicle detected by an acceleration sensor and a magnetic field detected by a magnetic sensor, outputting, by the first control unit, a corresponding signal according to the state of alighting of the user from the vehicle, and terminating, by a second control unit, execution of the vehicle application according to the signal.

In accordance with another aspect of the present disclosure, a method for controlling a vehicle application is provided. The method includes determining, by a first control unit, a state of entry or alighting of a user into or from a vehicle based on a motion pattern of entering or alighting from the vehicle detected by an acceleration sensor and a magnetic field detected by a magnetic sensor, outputting, by the first control unit, a corresponding signal according to the state of entry or alighting of the user into or from the vehicle, and executing, by a second control unit, the vehicle application if the user enters the vehicle or terminating execution of the vehicle application if the user alights from the vehicle according to the signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
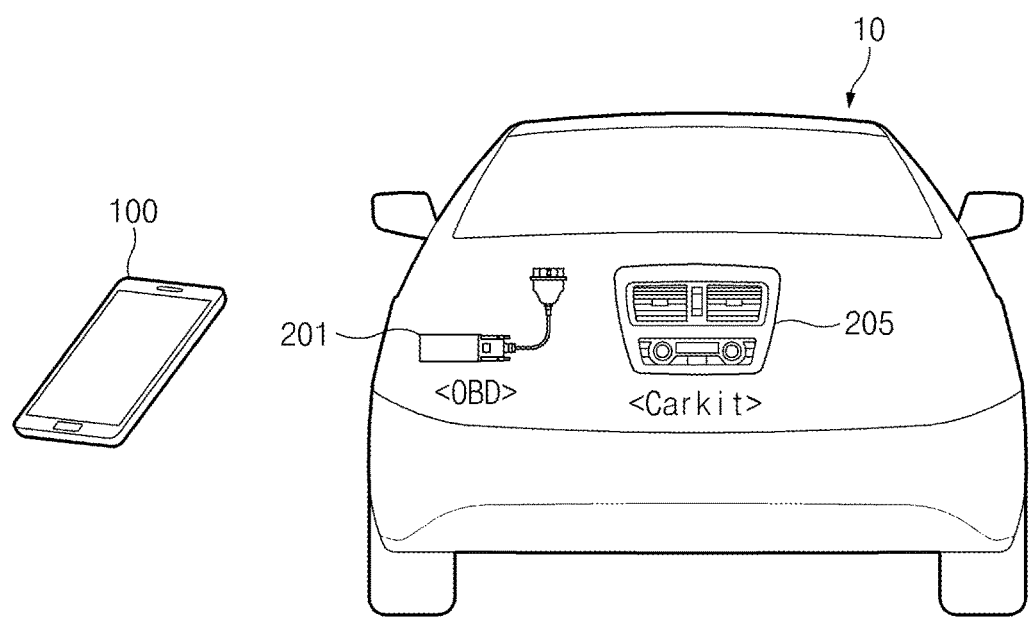
FIG. 1 is a diagram illustrating a system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising" used herein indicates disclosed functions, operations, or existence of elements but does not exclude other functions, operations or elements. It should be further understood that the term "include", "including", "comprise", "comprising", "have", or "having" used herein specifies the presence of stated features, numbers, operations, elements, components, or combinations thereof but does not preclude the presence or addition of one or more other features, numbers, operations, elements, components, or combinations thereof.

The meaning of the term "or" or "at least one of A and/or B" used herein includes any and all combinations of words listed together with the term. For example, the wording "A or B" or "at least one of A and/or B" may indicate A, B, or both A and B.

The terms such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, a first user device and a second user device indicate different user devices. For example, without departing the scope of the present disclosure, a first element may be named as a second element, and similarly, a second element may be named as a first element.

It will be understood that when an element is referred to as being "connected" or "coupled" to another element, it can be directly connected or coupled to the other element or intervening elements may be present. In contrast, when an element is referred to as being "directly connected" or "directly coupled" to another element, it should be understood that there are no intervening elements.

The terminology used herein is not for delimiting the present disclosure but for describing specific various embodiments of the present disclosure.

The terms used herein, including technical or scientific terms, have the same meanings as understood by those skilled in the art unless otherwise defined herein. The commonly used terms such as those defined in a dictionary should be interpreted in the same context as in the related art and should not be interpreted in an idealized or overly formal detect unless otherwise defined explicitly.

Electronic devices (including mobile terminals) according to various embodiments of the present disclosure may have a communication function. For example, the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., head-mounted-devices (HMDs) such as electronic glasses, an electronic apparel, electronic bracelets, electronic necklaces, electronic appcessories, electronic tattoos, or smart watches).

According to various embodiments of the present disclosure, the electronic devices may include at least one of medical devices (e.g., a magnetic resonance angiography (MRA), a magnetic resonance imaging (MRI), a computed tomography (CT), scanners, or ultrasonic devices), navigation devices, global positioning system (GPS) receivers, event data recorders (EDRs), flight data recorders (FDRs), vehicle infotainment devices, security devices, or head units for vehicles.

The electronic devices according to various embodiments of the present disclosure may be one or more combinations of the above-mentioned devices. Furthermore, the electronic devices according to various embodiments of the present disclosure may be flexible devices. It would be obvious to those skilled in the art that the electronic devices according to various embodiments of the present disclosure are not limited to the above-mentioned devices.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses the electronic device.

FIG. 1 is a diagram illustrating a system according to an embodiment of the present disclosure.

Referring to FIG. 1, the system may include a mobile terminal 100 and an electronic device in a vehicle. The mobile terminal 100 may provide a vehicle-associated service supported by the mobile terminal 100 if the mobile terminal 100 detects that a driver enters a vehicle through a sensor and/or an electronic device while being operated in a sleep mode. The mobile terminal 100 may terminate the vehicle-associated service provided by the mobile terminal 100 if the mobile terminal 100 detects that the driver alights from the vehicle through the sensor and/or the electronic device. Although not illustrated in FIG. 1, the mobile terminal 100 may provide the vehicle-associated service based on information received from a wearable device when a communication connection is established between the mobile terminal 100 and the wearable device paired therewith.

Here, the mobile terminal 100 may support various user functions according to user manipulation.

For example, the mobile terminal 100 may support various functions such as a navigation function, a black bock function, a music playback function, a call function, a search function, and the like according to user manipulation and the types of installed application programs. If a condition predefined by a sensor unit and/or a communication unit is satisfied while the mobile terminal 100 is operated in the sleep mode, the mobile terminal 100 may support automatic performance of at least one of the foregoing functions (while remaining in the sleep mode or after being released from the sleep mode). In the present disclosure, the sleep mode may correspond to a state in which a portion of functions of the mobile terminal 100 is inactivated to save power consumption thereof if there is no input to the mobile terminal 100 for a specified time, or a state in which a display is turned off by the user. Furthermore, the mobile terminal 100 may determine whether the user enters or alights from a vehicle to support automatic inactivation of a predefined function.

Here, the mobile terminal 100 that is able to be carried by the user may be a wireless mobile terminal such as a smartphone, a laptop computer, a netbook computer, a tablet PC, an electronic book terminal, a PDA, or the like. The mobile terminal 100 will be described in more detail with reference to FIG. 2A.

In embodiments of the present disclosure, the electronic device may support control of various driving functions of a vehicle 10. For example, the electronic device may electronically support various control operations such as exhaust gas control, engine control, light control, brush control, and the like. For example, the electronic device may correspond to an on board diagnostics (OBD) 201, a car kit 205, or the like.

The electronic device may provide, to the mobile terminal 100, identification information on a vehicle-associated service supported by the mobile terminal 100. The electronic device may be communicatively connected to the mobile terminal 100 based on information provided from the mobile terminal 100. In this case, the electronic device may control driving of a vehicle-associated service provided from the mobile terminal 100 communicatively connected to the electronic device. Regarding such an electronic device, an electronic device will be described in more detail below.

Figure 2A:
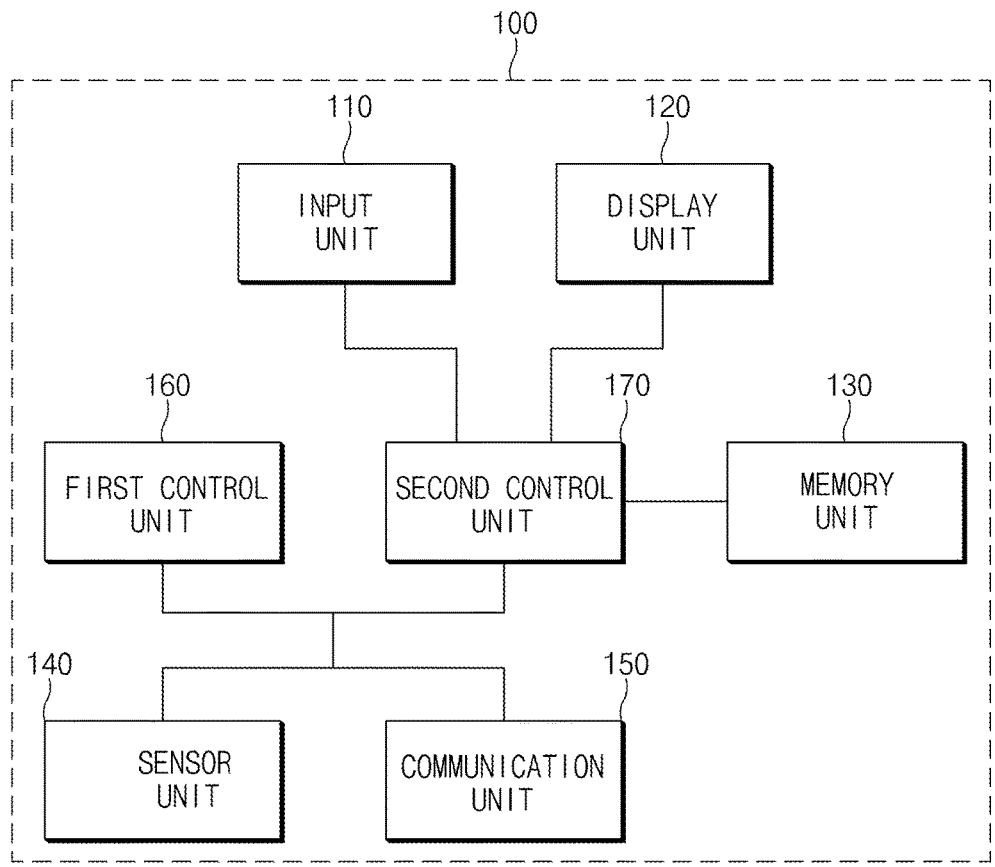
FIG. 2A is a block diagram illustrating a configuration of a mobile terminal according to an embodiment of the present disclosure.

FIG. 2A is a block diagram illustrating a configuration of a mobile terminal according to an embodiment of the present disclosure.

Referring to FIG. 2A, the mobile terminal 100 may include an input unit 110, a display unit 120, a memory unit 130, a sensor unit 140, a communication unit 150, a first control unit 160, and a second control unit 170.

The input unit 110 receives a predetermined signal from the user. The input unit 110 may be a keypad provided with a plurality of key buttons, or may be a touchscreen enabling implementation of a soft key on a screen. In addition, the input unit 110 may correspond to various units capable of inputting a signal to the mobile terminal 100 in response to manipulation by the user, such as a joystick, a wheel, or the like. Furthermore, the input unit 110 may include a function key, a soft key, and the like selected for controlling a vehicle application such as applications that support navigation, music playback, making a call, and the like.

The display unit 120 may display an execution screen according to operation of the mobile terminal 100. For example, the display unit 120 may include a liquid crystal display (LCD), an organic light-emitting diode (OLED), an active matrix OLED (AMOLED), or the like, and may be provided with a touchscreen that supports touch-based input.

A screen for configuring a vehicle application may be displayed on the display unit 120. Furthermore, the display unit 120 may display an implementable screen while a vehicle application is executed, such as a menu selection screen, a navigation guide screen, a music playback screen, a call connection screen, or the like.

Moreover, the display unit 120 may display information on electronic devices such as an OBD, a car kit, or the like discovered around the mobile terminal 100. In addition, the display unit 120 may display a control screen, a guide screen, a setting screen, or the like for establishing a communication connection to the electronic device.

The memory unit 130 may store a setting value for operating the mobile terminal 100. The memory unit 130 may store a program, an application, or the like for implementing operation of the mobile terminal 100. The memory unit 130 may store a configuration value for running a vehicle application. For example, the memory unit 130 may store an automatic execution condition and an automatic termination condition of the vehicle application, vehicle information (e.g., MyCar ID), mobile terminal information, or the like.

Here, the automatic execution condition and the automatic termination condition of the vehicle application may be set with a sensor value detected by a sensor of the sensor unit 140, for example, magnetic field information obtained by a magnetic sensor, a motion pattern of entering or alighting from a vehicle detected by an acceleration sensor, or the like. The automatic execution condition and the automatic termination condition of the vehicle application may be set with a state of communication connection to an electronic device such as an OBD, a car kit, or the like discovered around the mobile terminal 100. However, the above-mentioned conditions are merely examples, and the present disclosure is not limited thereto.

Furthermore, the memory unit 130 may store information generated for performing communication between the mobile terminal 100 and an external electronic device, for example, a media access control (MAC) address, a terminal identifier, a vehicle identifier (e.g., MyCar ID), a vehicle application identifier (e.g., a service unique user identifier (UUID)), or the like. Furthermore, the memory unit 130 may store information for establishing a communication connection to a wearable device and information generated for performing communication with the wearable device.

The sensor unit 140 may detect a motion of a body of the mobile terminal 100. Here, the sensor unit 140 may correspond to at least two of a magnetic sensor for detecting magnetic fields around the mobile terminal 100, an acceleration sensor for outputting an electrical signal according to triaxial acceleration generated from the motion of the body of the mobile terminal 100, an inertia sensor for outputting an electrical signal according to a triaxial position change generated from the motion of the body of the mobile terminal 100, and a microphone for detecting a noise around the mobile terminal 100.

For example, the magnetic sensor may detect a value of a magnetic field formed by a permanent magnet of a speaker installed in a door of the vehicle or a change in the magnetic field, when the mobile terminal 100 enters the vehicle from outside of the vehicle. Furthermore, the magnetic sensor may detect the change in the magnetic field when the mobile terminal 100 is moved out of the vehicle. The acceleration sensor may detect a walking state or a walking-stopped state of the user that carries the mobile terminal 100, and may detect a specific motion pattern generated by a movement of the user, for example, a motion pattern of entering or alighting from the vehicle. The inertia sensor may detect, in the vehicle, a vibration generated by starting the vehicle. The microphone may detect a sound (or noise) generated when the door of the vehicle is closed or the ignition of the vehicle is turned on or off, or a waveform of the sound.

If the user is in the vehicle, the sensor unit 140 may detect information for confirming a position of the user. For example, the magnetic sensor may detect a magnetic field change, and the acceleration sensor may detect a direction of entering the vehicle of the user (e.g., a direction from the left of the vehicle to the right of the vehicle, or a direction from the right of the vehicle to the left of the vehicle). Furthermore, the inertia sensor may detect a tilt direction of the vehicle when the user enters the vehicle, and the microphone may detect a noise direction when the door of the vehicle is closed.

The sensor unit 140 may correspond to a sensor for detecting a movement of the mobile terminal 100, a state change of the periphery of the mobile terminal 100, a loading and/or unloading state of the vehicle, and the position of the user in the vehicle, in addition to the above-mentioned sensors.

The sensor unit 140 may provide, to the first control unit 160, information detected by each sensor so that the loading and/or unloading state of the vehicle, the position of the user in the vehicle, and the like may be determined. In one embodiment of the present disclosure, the sensor unit 140 may directly provide the information detected by each sensor to the second control unit 170.

The communication unit 150 may support a wireless communication interface for the mobile terminal 100. Here, the communication unit 150 may include a wireless local area network (WLAN) module for supporting short-range communication with an external device, for example, a wearable device, a vehicle accessory such as an OBD, a car kit, or the like. The WLAN module may support various short-range communication technologies such as Bluetooth low energy (BLE), Bluetooth, and the like.

For example, the WLAN module may perform a Bluetooth-based paging operation on a paired wearable device, and may be communicatively connected to the wearable device so as to transmit/receive predetermined data to/from the wearable device. Here, the WLAN module may receive predetermined motion information from the wearable device, and may provide the received operation information to the first control unit or the second control unit 170. The WLAN module may attempt to perform a BLE- and/or Bluetooth-based paging operation on the OBD, the car kit, or the like, and may be communicatively connected thereto to receive a control command of a vehicle application. Here, the communication unit 150 may provide, to the second control unit 170, the control command received from the OBD, the car kit, or the like.

The communication unit 150 may include a first communication unit and a second communication unit according to a short-range communication method. Here, the first communication unit may support any one of BLE and Bluetooth, and the second communication unit may support another communication method different from that of the first communication unit. For example, the first communication unit may be operated based on the BLE technology if the mobile terminal 100 is operated in the sleep mode, and the second communication unit may be operated based on the Bluetooth technology if the mobile terminal 100 is operated in a normal mode. However, this configuration is merely an example, and the present disclosure is not limited thereto.

The communication unit 150 may further include at least one of a communication module for establishing a communication channel to a cellular network or a GPS module for communicating with a satellite. The GPS module may collect GPS information (e.g., position coordinates, altitude, or the like) obtained when the user alights from the vehicle, and may provide the GPS information to the second control unit 170.

The first control unit 160 may monitor operation of the sensor unit 140 and/or the communication unit 150 while the mobile terminal 100 is operated in the sleep mode. Here, the first control unit 160 may be a sensor hub.

The first control unit 160 may monitor operation of each sensor included in the sensor unit 140. Here, the first control unit 160 may determine whether a predefined condition is satisfied based on information detected by each sensor in order to execute the vehicle application and/or a specific function associated with the vehicle. For example, the first control unit 160 may determine whether a predefined motion pattern of entering a vehicle (e.g., walking→stop) or alighting from a vehicle (e.g., stop→walking) using the acceleration sensor. Furthermore, the first control unit 160 may determine whether a predefined magnetic field (e.g., a magnetic field value or a magnetic field change) is detected using the magnetic sensor. In this case, the first control unit 160 may compare a magnetic field detected by the magnetic sensor with at least one of magnetic field information registered for the vehicle of the user and magnetic field information provided by a vehicle manufacturer, and may determine whether the predefined magnetic field is detected based on a result of the comparison. Here, the first control unit 160 may determine whether the detected motion and the detected magnetic field correspond to pre-defined condition of entering a vehicle. For example, the first control unit 160 may determine that the detected motion and the detect magnetic field correspond to the predefined condition (i.e., the user has entered the vehicle) if the predefined motion pattern of entering a vehicle is detected by the acceleration sensor and the predefined magnetic field is detected by the magnetic sensor. The first control unit 160 may generate a signal for driving the second control unit 170 if information detected by the sensor unit 140 satisfies the predefined condition.

Here, the first control unit 160 may determine whether a specified condition is satisfied based on information detected by each sensor in order to terminate the vehicle application and/or a specific function associated with the vehicle (and is being performed). For example, the first control unit 160 may determine whether the magnetic field detected by the magnetic sensor is changed from the predefined magnetic field. The first control unit 160 may determine that the detected motion and the detected magnetic field correspond to a predefined condition of alighting from a vehicle (i.e., the user has alighted from the vehicle) if the predefined motion pattern of alighting from a vehicle is detected by the acceleration sensor and the magnetic field detected by the magnetic sensor is changed from the predefined magnetic field. The first control unit 160 may generate a signal for terminating the vehicle application and/or the function performed by the second control unit 170, if information detected by the sensor unit 140 satisfies a predefined condition.

The first control unit 160 may determine whether a vibration of a predefined pattern is detected using the inertia sensor of the sensor unit 140. The first control unit 160 may also determine whether a noise with a predefined volume or tone (waveform) is detected using the microphone of the sensor unit 140. The first control unit 160 may determine that the user has entered or alighted from the vehicle if the predefined vibration and/or noise are detected and information detected by the acceleration sensor and the magnetic sensor satisfies a predefined condition. In one embodiment of the present disclosure, the first control unit 160 may determine that the user has entered or alighted from the vehicle if information detected by at least two of the acceleration sensor, the magnetic sensor, the inertia sensor, and the microphone satisfies a predefined condition.

If the user has entered the vehicle, the first control unit 160 may determine the position of the user or the position of the user's mobile terminal 100 based on information detected by at least one of the acceleration sensor, the magnetic sensor, the inertia sensor, and the microphone. For example, the first control unit 160 may determine which one of a driver seat and a passenger seat the user (or the mobile terminal 100) is positioned on, based on at least one of the magnetic field change detected by the magnetic sensor, the direction of entering the vehicle detected by the acceleration sensor, the tilt direction detected by the inertia sensor, and the noise direction detected by the microphone.

The first control unit 160 may be provided with predetermined motion information received from an external device such as a wrist wearable device through the communication unit 150. If the user enters the vehicle, the first control unit 160 may determine the position of the user (e.g., a driver seat or a passenger seat) based on the predetermined motion information provided from the external device, such as information on a motion and/or a direction of a hand that closes the door of the vehicle.

The first control unit 160 may generate a signal for driving the second control unit 170, upon receiving a beacon from an external electronic device such as the OBD, the car kit, or the like through the communication unit 150 while the mobile terminal 100 is operated in the sleep mode. Furthermore, the first control unit 160 may check a link key of a signal received from the electronic device to control a communication connection between the communication unit 150 and the electronic device. For example, the first control unit 160 may extract a vehicle identifier and a vehicle application setting value based on a vehicle application identifier (e.g., a service UUID) included in a beacon received from the electronic device, and may allow the extracted vehicle identifier and vehicle application setting value to be transmitted. In this case, the electronic device may control the vehicle application of the mobile terminal 100 based on the vehicle identifier and the vehicle application setting value. If the communication connection to the electronic device such as the OBD, the car kit, or the like established through the communication unit 150 is released while the vehicle application is executed in the mobile terminal 100, the first control unit 160 may generate a signal for terminating the execution of the vehicle application.

The first control unit 160 may provide, to the second control unit 170, distance information according to a received signal strength indication (RSSI) change of a signal transmitted/received from/to an external device (e.g., a wearable device, an OBD, a car kit, or the like) connected by the communication unit 150. In this case, the second control unit 170 may request a vehicle state check or may perform a notification function regarding the mobile terminal 100 (e.g., notification on leaving the mobile terminal 100 when alighting from the vehicle 10) based on the distance information provided from the first control unit 160.

When the mobile terminal 100 is operated in the sleep mode (e.g., when the second control unit 170 is inactivated), the second control unit 170 may be driven (or activated) based on a signal received from the first control unit 160. For example, the second control unit 170 may be driven based on a signal generated upon detection of a motion of entering the vehicle by the first control unit 160. Furthermore, the second control unit 170 may be driven based on a signal generated by the first control unit 160 when a beacon is received from the electronic device (e.g., an OBD, a car kit, or the like).

Once the second control unit 170 is driven based on the signal generated by the first control unit 160, the second control unit 170 may automatically execute a specified vehicle application. In this case, the second control unit 170 may provide various functions such as a navigation function, a black box function, a music playback function, a calling function, a search function, and the like. Furthermore, the second control unit 170 may provide an entry-to-vehicle notification function for transmitting entry-to-vehicle information to a registered device if the vehicle application is executed.

The second control unit 170 may provide different functions according to the position of the user or the mobile terminal 100 in the vehicle. For example, the second control unit 170 may provide a function for a driver or a function for a passenger based on whether the in-vehicle position of the mobile terminal 100 corresponds to a position of a driver or a position of a passenger. Here, the second control unit 170 may execute a pre-specified first function according to the position of the user determined by the first control unit 160, and may restrict and inactivate a second function. For example, if it is determined that the user in the vehicle is a driver, the second control unit 170 may provide a vehicle driving information list and may inactivate a digital multimedia broadcasting (DMB) viewing function and a video playback function. If it is determined that the user sits on a passenger seat, the second control unit 170 may activate the DMB viewing function and the video playback function and may not provide the vehicle driving information list.

The second control unit 170 may control operation of the vehicle application according to a control command of the user input through the input unit 110, while executing the vehicle application. If the mobile terminal 100 is communicatively connected to the electronic device by the communication unit 150, the second control unit 170 may control the vehicle application according to a remote control received from the electronic device.

The second control unit 170 may terminate the vehicle application being executed, based on a signal received from the first control unit 160. For example, if it is determined by the first control unit 160 that the user has alighted from the vehicle, the second control unit 170 may terminate, based on the signal received from the first control unit, the execution of the vehicle application and/or the function being executed. If the communication connection to the electronic device established by the communication unit 150 is released, the second control unit 170 may terminate, based on the signal received from the first control unit 160, the execution of the vehicle application and/or the function being executed.

Here, upon receiving a signal from the first control unit 160 as the user alights from the vehicle or the communication connection to the electronic device is released, the second control unit 170 may store at least one of pieces of location information detected by the GPS module such as position coordinates and altitude information in the memory unit 130, and then may terminate the execution of the vehicle application and/or the function. Here, the location information stored in the memory unit 130 may be used later to perform a vehicle location tracking function through the mobile terminal 100.

Furthermore, the second control unit 170 may request the first control unit 160 to check a signal strength regarding an external device (e.g., a wearable device, an OBD, a car kit, or the like) connected by the communication unit 150. Here, the second control unit 170 may receive, from the first control unit 160, the distance information according to the RSSI change, and may request a vehicle state check or may perform a notification function regarding the mobile terminal 100 (e.g., notification on leaving the mobile terminal 100 when alighting from the vehicle 10) based on the received distance information. For example, if a distance to the wearable device is equal to or larger than a reference value after the vehicle is driven, the second control unit 170 may perform the notification function regarding the mobile terminal 100 (e.g., notification on leaving the mobile terminal 100 when alighting from the vehicle 10) so that an alarm is output. In this case, the alarm may be output in the form of a warning sound through the mobile terminal 100. Furthermore, the alarm may be output in the form of warning light, a warning sound, or the like by the wearable device and/or the electronic device, or may be displayed as an alarm message through a screen of the wearable device.

If a distance to the electronic device is equal to or larger than a reference value after the vehicle is driven, the second control unit 170 may send a request for a vehicle state check to the electronic device. In response to the request from the second control unit 170, the electronic device may check a state of a door, a window, a light, an ignition, a gear, or the like of the vehicle, and may provide a result of the check to the mobile terminal 100. The second control unit 170 may allow an alarm to be output based on the result of the vehicle state check from the electronic device. Furthermore, the second control unit 170 may allow the result of the vehicle state check from the electronic device to be transmitted to a pre-registered external device.

Figure 2B:
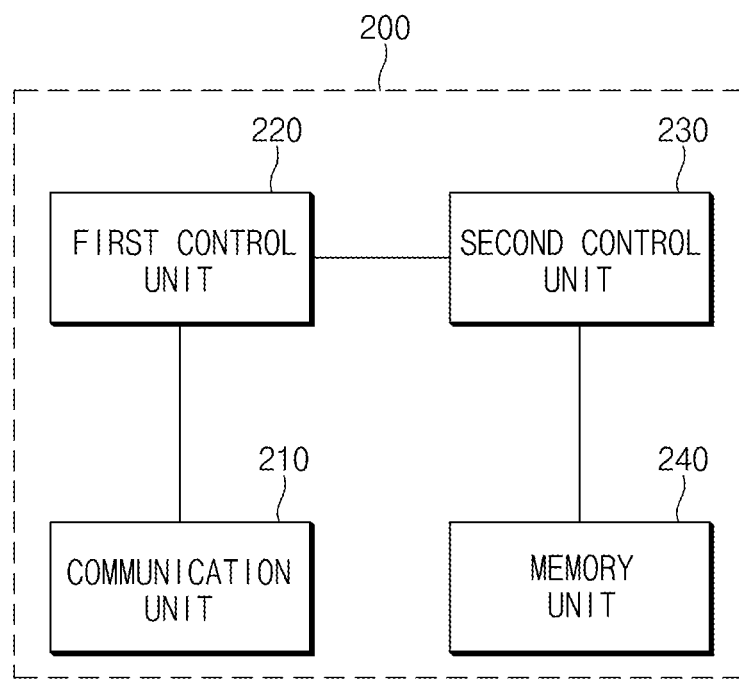
FIG. 2B is a block diagram illustrating a configuration of an electronic device according to an embodiment of the present disclosure.

FIG. 2B is a block diagram illustrating a configuration of an electronic device according to an embodiment of the present disclosure.

Referring to FIG. 2B, the electronic device 200 may include a communication unit 210, a first control unit 220, a second control unit 230, and a memory unit 240.

The communication unit 210 may support a wireless communication interface for the electronic device 200. Here, the communication unit 210 may include a WLAN module for supporting short-range communication with an external mobile terminal. The WLAN module may support various short-range communication technologies such as BLE, Bluetooth, and the like.

For example, the communication unit 210 may perform a BLE- and/or Bluetooth-based paging operation on the mobile terminal so as to be connected to the mobile terminal Here, the communication unit 210 may broadcast a beacon including the vehicle application identifier, and may receive information on the vehicle identifier and the vehicle application setting value from the mobile terminal that has received the beacon. The communication unit 210 may transmit, to the mobile terminal, a control command generated based on the vehicle identifier and the vehicle application setting value from the mobile terminal.

The communication unit 210 may include a first communication unit and a second communication unit according to a short-range communication method. Here, the first communication unit may support any one of BLE and Bluetooth, and the second communication unit may support another communication method different from that of the first communication unit. For example, the first communication unit may broadcast a BLE-based beacon to receive information on the vehicle identifier and the vehicle application setting value from the mobile terminal, and the second communication unit may transmit, to the mobile terminal, a control command generated based on the vehicle identifier and the vehicle application setting value from the mobile terminal Here, the second communication unit may be driven if a beacon is received by the first communication unit. In an embodiment, signals may be transmitted/received by only one of the first and second communication units between the electronic device 200 and the mobile terminal.

The memory unit 240 may store a setting value for operating the electronic device 200, and may store a program, an algorithm, or the like for implementing a vehicle diagnosis operation of the electronic device 200.

Furthermore, the memory unit 240 may store information for establishing a communication connection to the mobile terminal, such as a MAC address of the electronic device 200, the terminal identifier, the vehicle identifier, the vehicle application identifier (e.g., a service UUID), or the like, and may store information generated for performing communication with the mobile terminal 100, such as a MAC address of the mobile terminal, the terminal identifier, the vehicle identifier (e.g., MyCar ID) registered in the mobile terminal, the vehicle application setting value, or the like.

The first control unit 220 may broadcast a beacon including the vehicle application identifier (e.g., a service UUID) through the communication unit 210. The first control unit 220 may control communication between the communication unit 210 and the mobile terminal based on a signal received from the mobile terminal in response to the beacon.

Here, the first control unit 220 may determine a communication method of the communication unit 210 for broadcasting a beacon or setting a communication link to the mobile terminal. For example, the first control unit 220 may perform control so that a beacon is broadcast using a first communication method (e.g., Bluetooth) and a communication link to the mobile terminal is set using the first communication method based on a signal received from the mobile terminal. The first control unit 220 may perform control so that a beacon is broadcast using a first communication method (e.g., BLE) and a communication link between the communication unit 210 and the mobile terminal is set using a second communication method (e.g., Bluetooth) based on a signal received from the mobile terminal.

The first control unit 220 may provide, to the second control unit 230, information on a state of communication with the mobile terminal. For example, when a communication connection to the mobile terminal is established, the first control unit 220 may provide relevant information to the second control unit 230. Here, the first control unit 220 may provide, to the second control unit 230, information on the vehicle identifier and the vehicle application setting value received from the mobile terminal in response to a beacon. The first control unit 220 may transmit a control command generated based on the vehicle identifier and the vehicle application setting value to the mobile terminal via the communication unit 210.

Furthermore, the first control unit 220 may provide, to the second control unit 230, information on the vehicle application executed by the mobile terminal, and may provide information on termination of execution of the vehicle application to the second control unit 230. If the communication connection to the mobile terminal is released, the first control unit 220 may provide relevant information to the second control unit 230.

Upon receiving the information on the vehicle identifier and the vehicle application setting value from the first control unit 220, the second control unit 230 may control operation of the mobile terminal based on the vehicle identifier and the vehicle application setting value.

For example, the second control unit 230 may compare the vehicle identifier received from the mobile terminal with the vehicle identifier of the vehicle provided with the electronic device 200 to recognize whether the vehicle is a vehicle of the user of the mobile terminal. Furthermore, the second control unit 230 may check an automatic execution function set in the vehicle application of the mobile terminal based on the vehicle application setting value received from the mobile terminal. Here, if a communication connection between the electronic device 200 and the mobile terminal is established, the second control unit 230 may generate a command for controlling operation of the vehicle application based on the vehicle identifier and the vehicle application setting value. The command generated by the second control unit 230 may be provided to the mobile terminal via the first control unit 220 so as to be used for performing a function of the vehicle application.

If it is detected by the mobile terminal that the user alights from the vehicle, the second control unit 230 may check a state of the vehicle according to a request of the mobile terminal. For example, the second control unit 230 may check an opened or closed state of the door of the vehicle, an opened or closed state of the window of the vehicle, a turned on or off state of the light of the vehicle, an ignition-on or off state of the vehicle, a gear state of the vehicle, or the like. These states are merely examples, and the second control unit 230 may check any state for determining whether the vehicle from which the user has alighted is in an abnormal state.

Vehicle state information determined by the second control unit 230 may be provided to the mobile terminal by the first control unit 220 so as to be used to notify the user of an abnormal state of the vehicle.

A flow or operation of the mobile terminal according to an embodiment of the present disclosure is described below.

Figure 3:
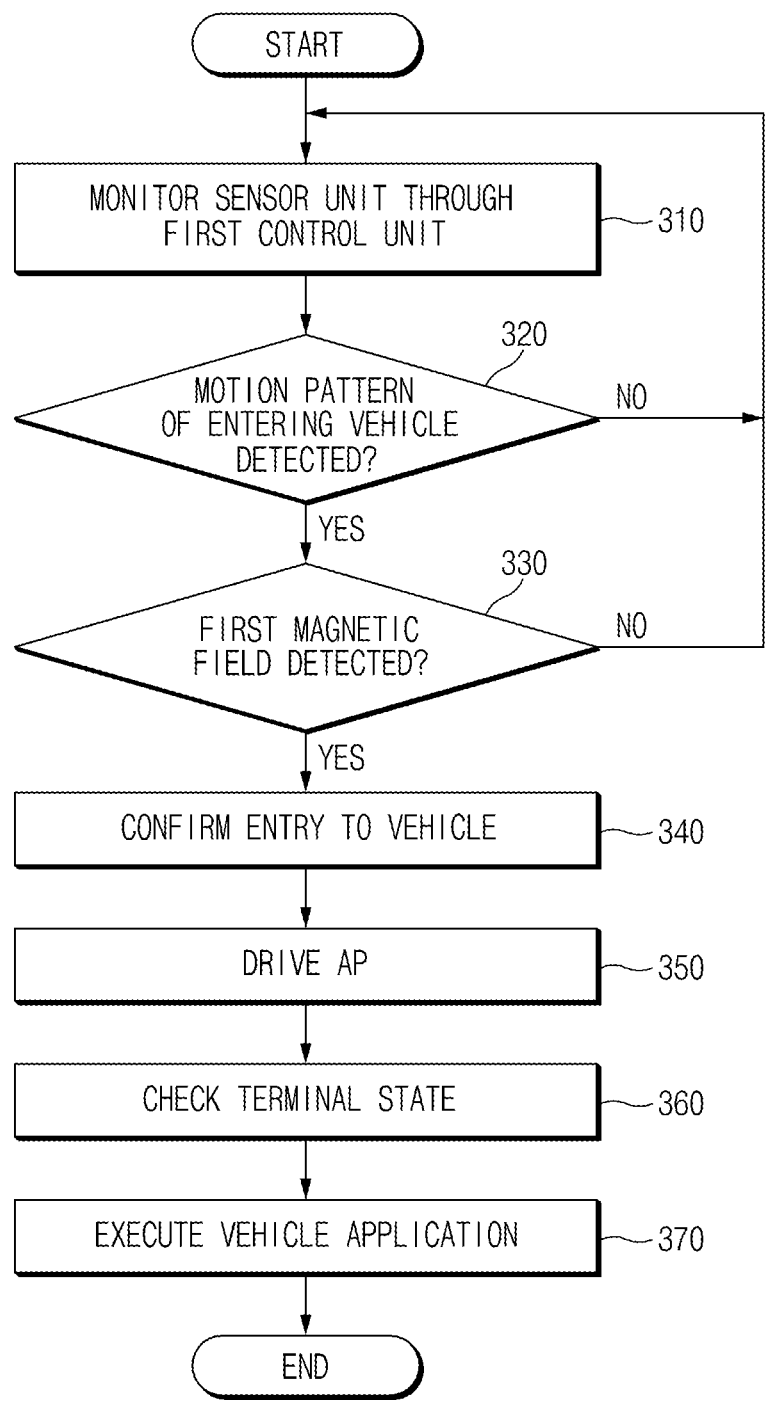
FIG. 3 is a flowchart illustrating a method of driving a vehicle application of a mobile terminal according to a first embodiment of the present disclosure.

FIG. 3 is a flowchart illustrating a method of driving a vehicle application of a mobile terminal according to a first embodiment of the present disclosure.

Referring to FIG. 3, in operation 310, the mobile terminal may monitor a sensor unit through a first control unit while being operated in a sleep mode. Here, if a predefined motion pattern of entering a vehicle is detected by an acceleration sensor in operation 320 and a predefined first magnetic field is detected by a magnetic sensor in operation 330, the mobile terminal may determine that a user that carries the mobile terminal has entered the vehicle in operation 340.

In this case, in operation 350, a second control unit such as an application processor (AP) may be driven by the first control unit. The second control unit may check a terminal state of the mobile terminal in operation 360, and may execute a vehicle application in operation 370. If it is determined by the first control unit that the user has entered the vehicle in operation 340, the mobile terminal may automatically perform operations 350 to 370.

If only one of the conditions of operations 320 and 330 is satisfied, or both the conditions of operations 320 and 330 are not satisfied, the mobile terminal may determine that the user has not entered the vehicle and may repeatedly perform operation 310.

Figure 4:
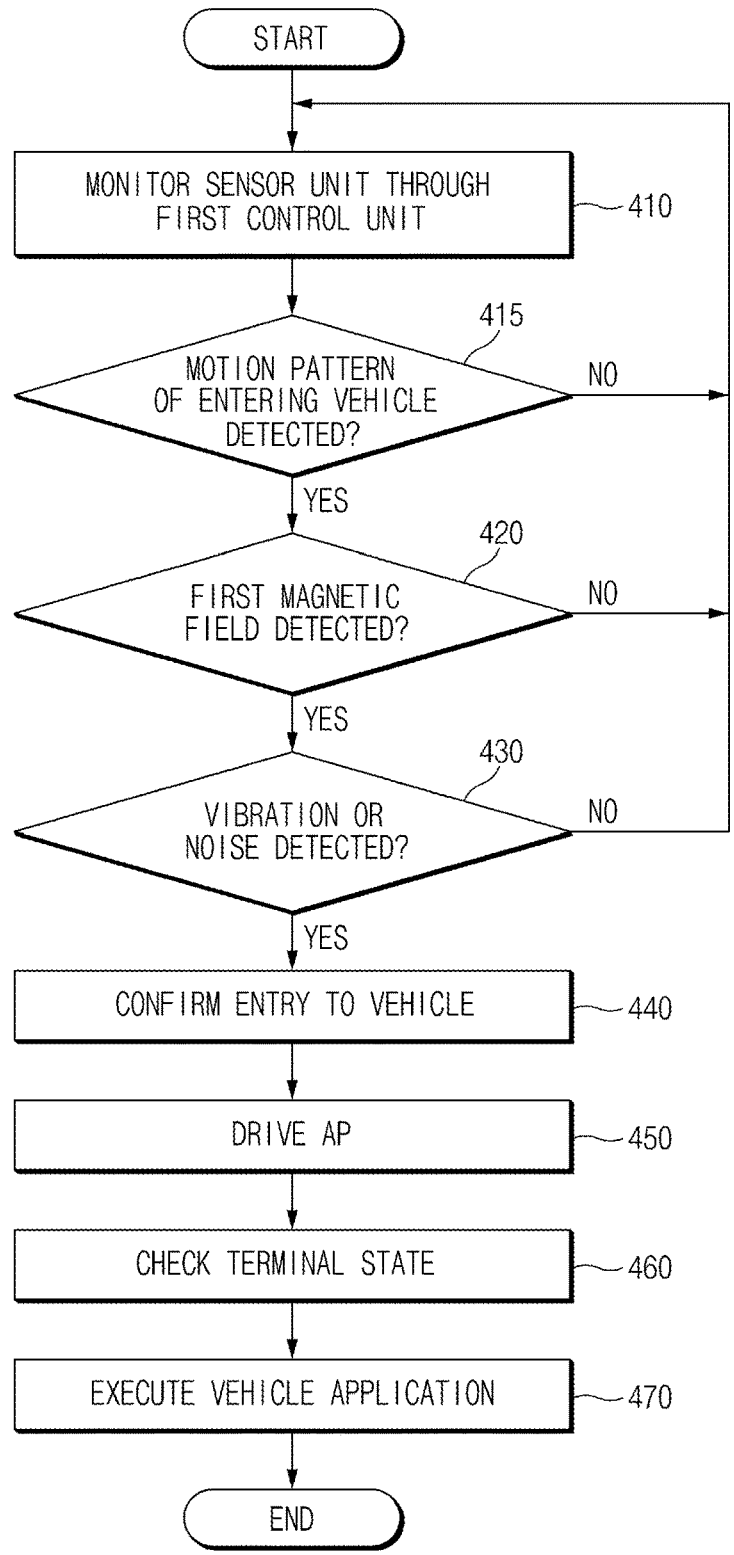
FIG. 4 is a flowchart illustrating a method of driving a vehicle application of a mobile terminal according to a second embodiment of the present disclosure.

FIG. 4 is a flowchart illustrating a method of driving a vehicle application of a mobile terminal according to a second embodiment of the present disclosure.

Referring to FIG. 4, in operation 410, the mobile terminal may monitor a sensor unit through a first control unit while being operated in a sleep mode. Here, the mobile terminal may determine that a user that carries the mobile terminal has entered the vehicle in operation 440, if a predefined vibration (e.g., a vibration caused by starting a vehicle) is detected by an inertia sensor or a predefined noise (e.g., a sound of closing a door, a sound of starting a vehicle, or the like) is detected by a microphone in operation 430, provided that a predefined motion pattern of entering a vehicle is detected by an acceleration sensor in operation 415 and a predefined first magnetic field is detected by a magnetic sensor in operation 420.

In this case, in operation 450, a second control unit (e.g., an AP) may be driven by the first control unit. The second control unit may check a terminal state of the mobile terminal in operation 460, and may execute a vehicle application in operation 470. Here, if it is determined by the first control unit that the user has entered the vehicle in operation 440, the mobile terminal may automatically perform operations 450 to 470.

If only one or two of the conditions of operations 415, 420, and 430 are satisfied, or none of the conditions of operations 415, 420, and 430 is satisfied, the mobile terminal may determine that the user has not entered the vehicle and may repeatedly perform operation 410.

FIG. 4 illustrates that it is determined that the user has entered the vehicle if all the conditions of operations 415, 420, and 430 are satisfied. However, according to another implementation of the method, it may be determined that the user has entered the vehicle if two or more of the conditions of operations 415, 420, and 430 are satisfied, and the subsequent operations may be performed.

Figure 5:
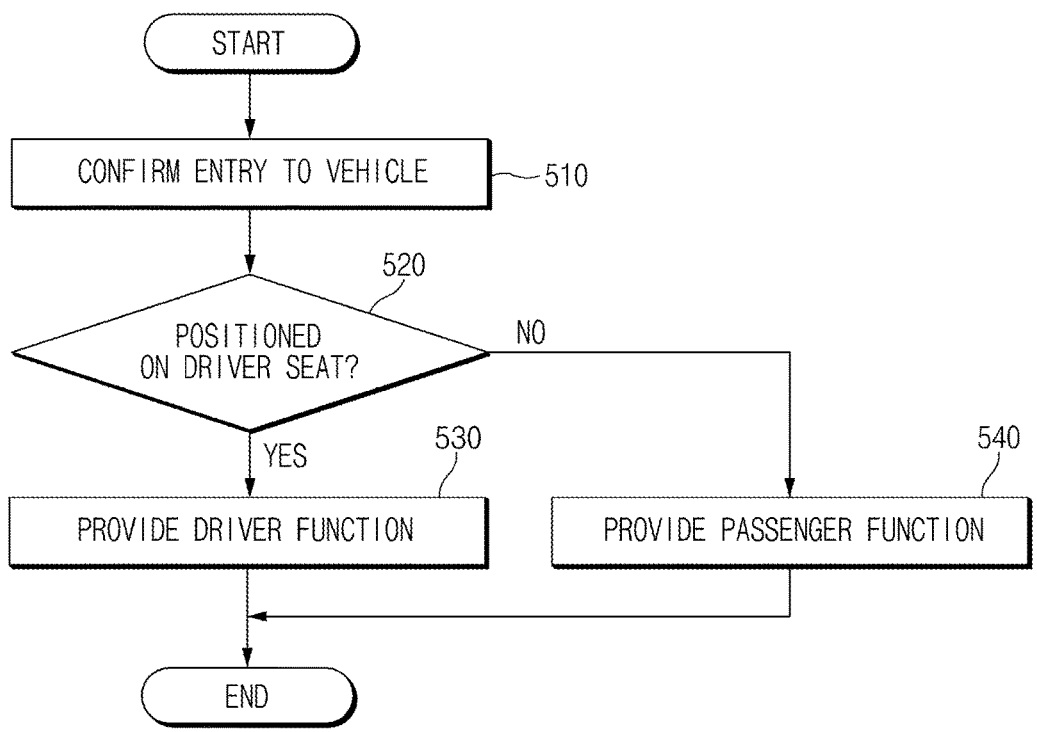
FIG. 5 is a flowchart illustrating a method of providing a function of a mobile terminal according to an embodiment of the present disclosure.

FIG. 5 is a flowchart illustrating a method of providing a function of a mobile terminal according to an embodiment of the present disclosure.

Referring to FIG. 5, if a user has entered a vehicle in operation 510, the mobile terminal may determine a position of the user in the vehicle in operation 520. For example, the mobile terminal may determine whether the user sits on a driver seat or sits on a passenger seat based on information detected by at least one of sensors such as an acceleration sensor, a magnetic sensor, an inertia sensor, and a microphone. The mobile terminal may also determine whether the user sits on the driver seat or sits on the passenger seat based on information received from at least one of external devices communicatively connected to the mobile terminal, such as a wearable device, an OBD, and a car kit.

If it is determined that the user is positioned in the driver seat in operation 520, the mobile terminal may provide a function corresponding to a driver through a vehicle application executed in the mobile terminal in operation 530. For example, the function corresponding to a driver may assign a high security level for a vehicle system and may provide information such as a security vehicle driving information list. The function corresponding to a driver may inactivate predefined functions (e.g., a DBM viewing function, a video playback function, and the like) that interfere with driving.

If it is determined that the user is not positioned in the driver seat in operation 520, the mobile terminal may provide a function corresponding to a passenger through a vehicle application executed in the mobile terminal in operation 540. For example, the function corresponding to a passenger (e.g., a passenger sitting on a passenger seat) may activate a DMB viewing function and a video playback function, and may assign a low security level for the vehicle system so as to inactivate functions related to vehicle management and/or driving, such as the vehicle driving information list.

Figure 6:
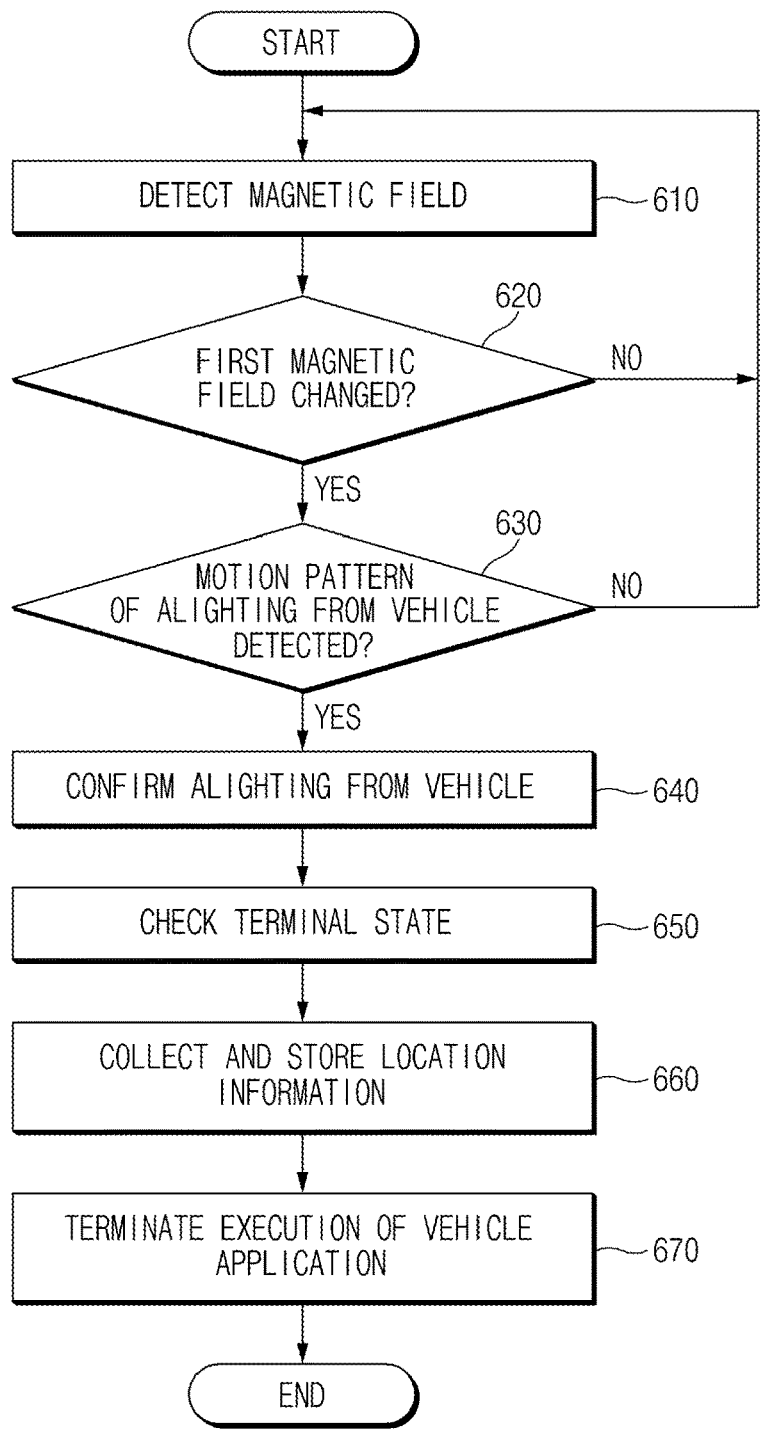
FIG. 6 is a flowchart illustrating a method of terminating a vehicle application of a mobile terminal according to a third embodiment of the present disclosure.

FIG. 6 is a flowchart illustrating a method of terminating a vehicle application of a mobile terminal according to a third embodiment of the present disclosure.

Referring to FIG. 6, the mobile terminal may monitor a sensor unit through a first control unit while the vehicle application is executed. Here, if a magnetic field is detected by a magnetic sensor in operation 610, the mobile terminal may determine whether the detected magnetic field is changed from a predefined first magnetic field. If the magnetic field detected by the magnetic sensor is changed from the predefined first magnetic field in operation 620 and a predefined motion pattern of alighting from a vehicle is detected by an acceleration sensor in operation 630, the mobile terminal may determine that a user that carries the mobile terminal has alighted from the vehicle in operation 640.

In this case, the mobile terminal may check a terminal state in operation 650, and may collect and store location information of a corresponding time point in operation 660. Thereafter, the mobile terminal may terminate the execution of the vehicle application in operation 670. Here, if it is determined that the user has alighted from the vehicle in operation 640, the mobile terminal may automatically perform operations 650 to 670.

If none of the conditions of operations 620 and 630 is satisfied, the mobile terminal may determine that the user has not alighted from the vehicle and may repeatedly perform operation 610.

Figure 7:
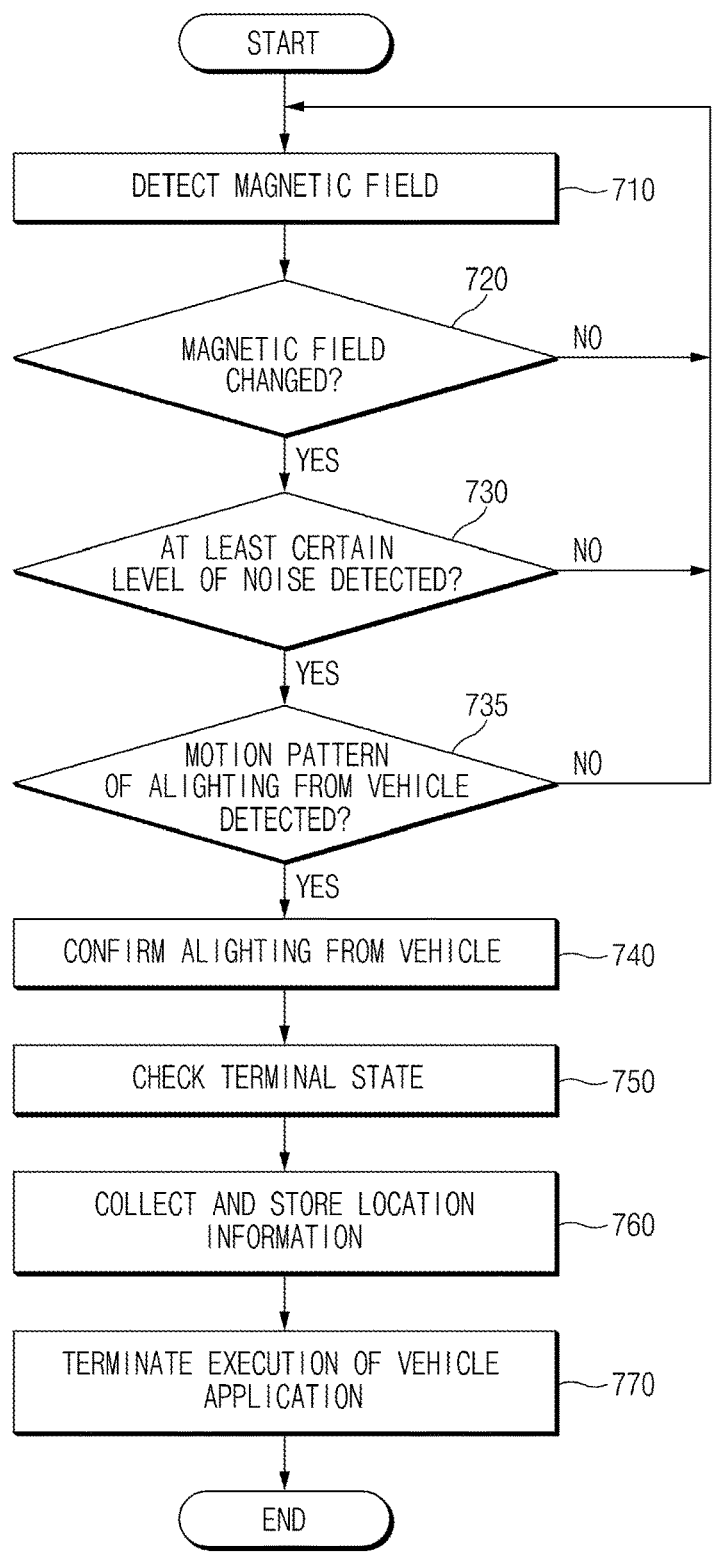
FIG. 7 is a flowchart illustrating a method of terminating a vehicle application of a mobile terminal according to a fourth embodiment of the present disclosure.

FIG. 7 is a flowchart illustrating a method of terminating a vehicle application of a mobile terminal according to a fourth embodiment of the present disclosure.

Referring to FIG. 7, the mobile terminal may monitor a sensor unit through a first control unit while the vehicle application is executed. Here, if a magnetic field is detected by a magnetic sensor in operation 710, the mobile terminal may determine whether the detected magnetic field is changed from a predefined first magnetic field. The mobile terminal may determine that a user that carries the mobile terminal has alighted from the vehicle in operation 740, if a predefined motion pattern of alighting from a vehicle is detected by an acceleration sensor in operation 735, provided that the magnetic field detected by the magnetic sensor is changed from the predefined first magnetic field in operation 720 and a predefined noise (e.g., a sound of closing a door) is detected by a microphone in operation 730.

In this case, the mobile terminal may check a terminal state in operation 750, and may collect and store location information of a corresponding time point in operation 760. Thereafter, the mobile terminal may terminate the execution of the vehicle application in operation 770. Here, if it is determined that the user has alighted from the vehicle in operation 740, the mobile terminal may automatically perform operations 750 to 770.

If only one or two of the conditions of operations 720, 730, and 735 are satisfied, or none of the conditions of operations 720, 730, and 735 is satisfied, the mobile terminal may determine that the user has not alighted from the vehicle and may repeatedly perform operation 710.

FIG. 7 illustrates that it is determined that the user has alighted from the vehicle if all the conditions of operations 720, 730, and 735 are satisfied. However, according to another implementation of the method, it may be determined that the user has alighted from the vehicle if two or more of the conditions of operations 720, 730, and 735 are satisfied, and the subsequent operations may be performed.

Figure 8:
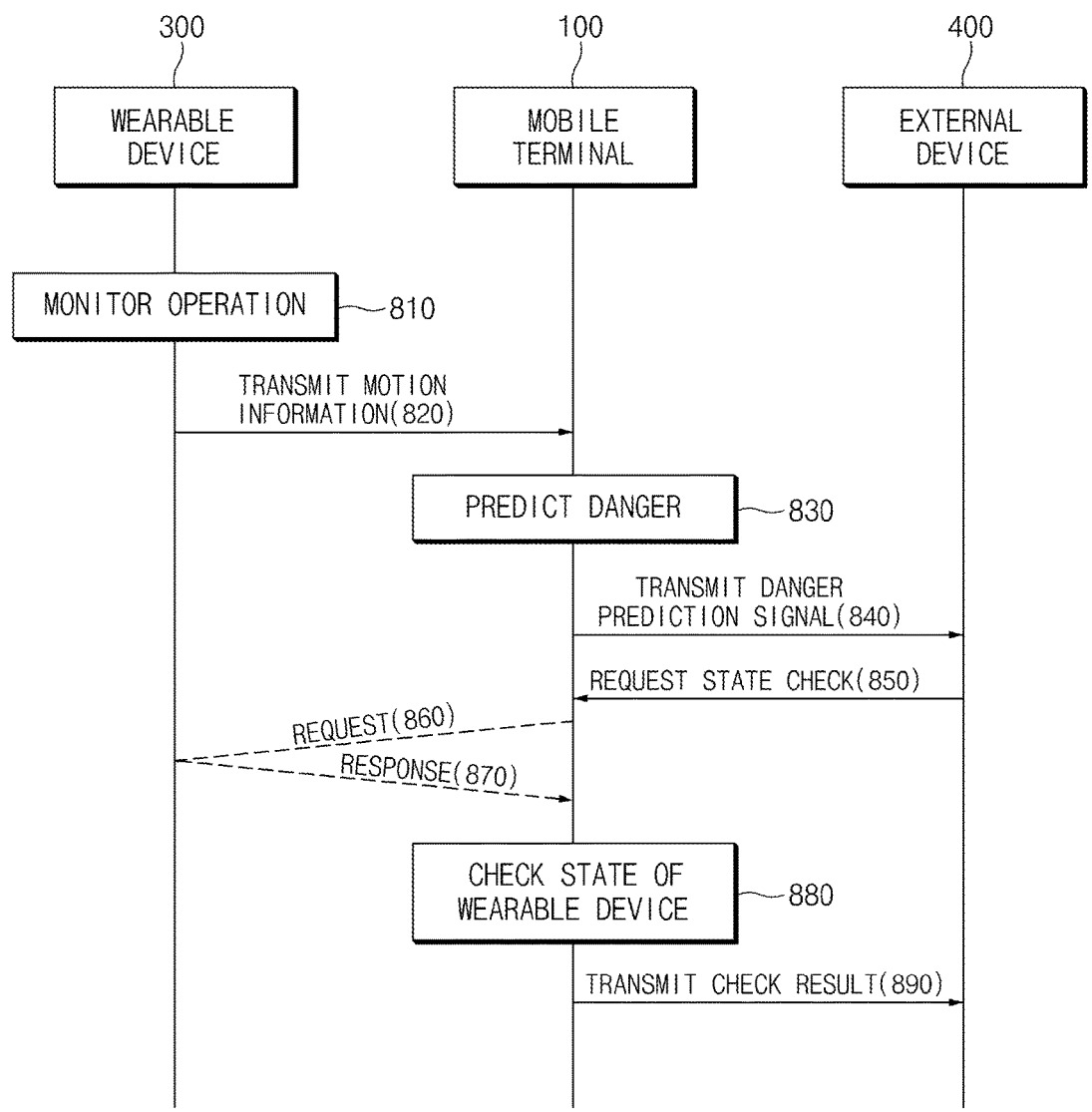
FIG. 8 is a flowchart illustrating a dangerous state notifying operation of a mobile terminal according to an embodiment of the present disclosure.

FIG. 8 is a flowchart illustrating a dangerous state notifying operation of a mobile terminal according to an embodiment of the present disclosure.

Referring to FIG. 8, a wearable device 300 is paired with the mobile terminal 100 so that a short-range wireless communication connection is established therebetween, and an external device 400 is registered in the mobile terminal 100.

The wearable device 300 (e.g., a wrist wearable device) may detect a motion of a user while a vehicle is driven in operation 810. For example, the wearable device 300 may detect a motion of manipulating a steering wheel by the user while the vehicle is driven. Here, the wearable device 300 may transmit motion information detected in operation 810 to the mobile terminal 100 in operation 820.

The mobile terminal 100 may predict a danger based on the motion information received from the wearable device 300 in operation 830. For example, if the information received from the wearable device 300 indicates that no motion is detected after the wearable device 300 is rapidly moved, the mobile terminal 100 may determine that the user of the wearable device 300 is in a dangerous state. If a danger is predicted in operation 830, the mobile terminal 100 may transmit a danger prediction signal to the external device 400 in operation 840.

After elapse of a certain time, the mobile terminal 100 may request a signal from the wearable device 300 in operation 860, if the external device 400 requests a state check in operation 850. Here, if the mobile terminal 100 receives a response from the wearable device 300 in operation 870, the mobile terminal 100 may check a state of the wearable device 300 based on the response from the wearable device 300 in operation 880, and may transmit a result of the check to the external device 400 in operation 890.

If operation 870 is not performed, the mobile terminal 100 may determine that a dangerous situation such as an accident has occurred since there is no response from the wearable device 300 in operation 880, and may provide relevant information to the external device 400 in operation 890.

If operation 880 is not performed due to failure of the mobile terminal 100, the external device 400 may determine that a dangerous situation such as an accident has occurred since there is no response from the mobile terminal 100, and may generate an emergency rescue signal.

Figure 9A:
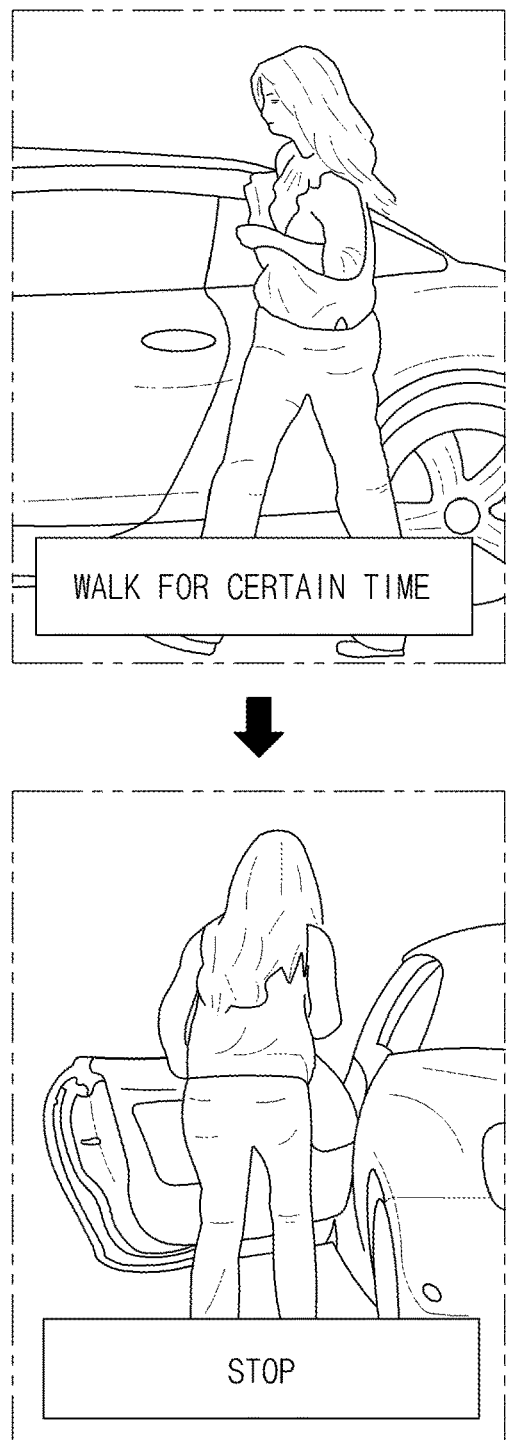
FIG. 9A is a diagram illustrating a motion pattern of entering a vehicle of a mobile terminal according to an embodiment of the present disclosure.

FIG. 9A is a diagram illustrating a motion pattern of entering a vehicle of a mobile terminal according to an embodiment of the present disclosure.

Referring to FIG. 9A, the mobile terminal may detect a motion pattern of the user through the acceleration sensor of the sensor unit. For example, the acceleration sensor may detect a walk or stop motion of the user.

Here, the mobile terminal may compare the motion pattern detected by the acceleration sensor with a pre-registered motion pattern of entering a vehicle to determine whether the patterns match each other. For example, if a walk motion is detected for at least a certain time and then a stop state (e.g., stop to enter a vehicle) is detected according to the pre-registered motion pattern of entering a vehicle, the mobile terminal may determine that the motion pattern of entering a vehicle has been detected by the acceleration sensor.

Figure 9B:
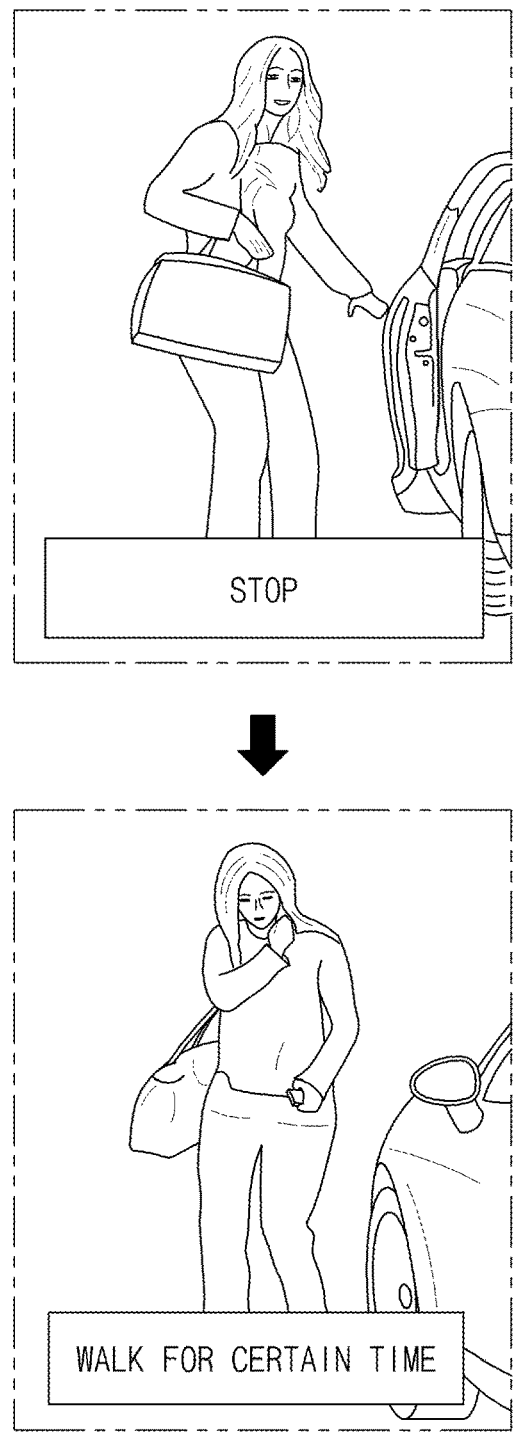
FIG. 9B is a diagram illustrating a motion pattern of alighting from a vehicle of a mobile terminal according to an embodiment of the present disclosure.

FIG. 9B is a diagram illustrating a motion pattern of alighting from a vehicle of a mobile terminal according to an embodiment of the present disclosure.

Referring to FIG. 9B, the mobile terminal may detect a motion pattern of the user through the acceleration sensor of the sensor unit. For example, the acceleration sensor may detect a walk or stop motion of the user.

Here, the mobile terminal may compare the motion pattern detected by the acceleration sensor with a pre-registered motion pattern of alighting from a vehicle to determine whether the patterns match each other. Here, the motion pattern of alighting from a vehicle may be a motion of walking for at least a certain time after standing still, on the contrary to that of FIG. 9A.

If a walk motion is detected for at least a certain time after a stop state according to the pre-registered motion pattern of alighting from a vehicle, the mobile terminal may determine that the motion pattern of alighting from a vehicle has been detected by the acceleration sensor. Here, the stop state of the motion pattern of alighting from a vehicle may be a state after alighting from a vehicle or a state of being in a vehicle.

Figure 9C:
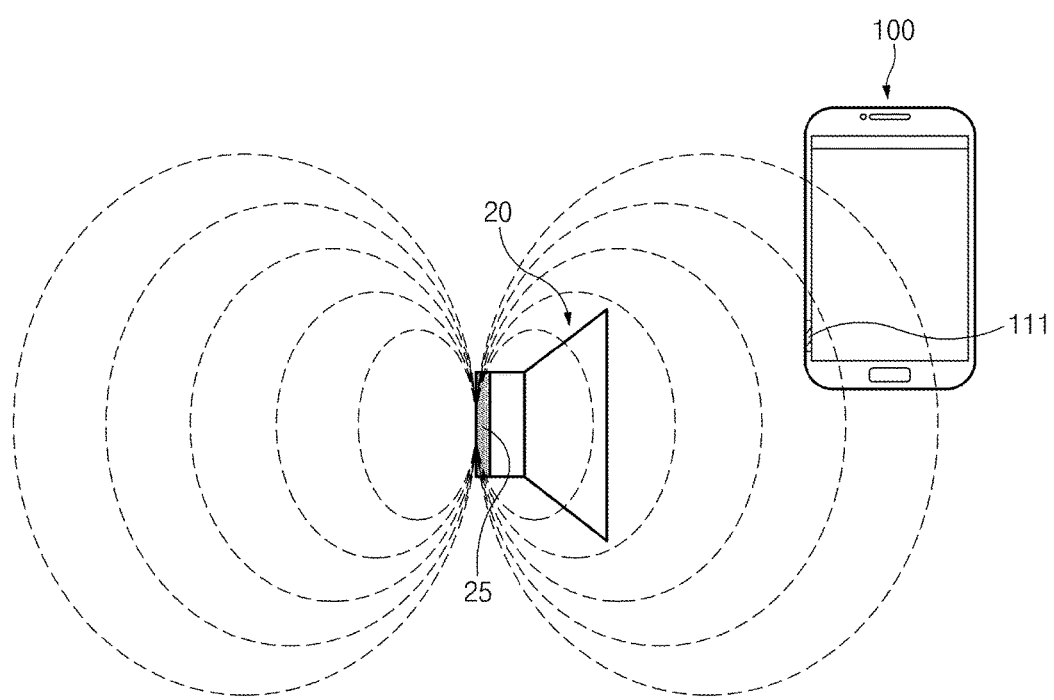
FIG. 9C is a diagram illustrating a magnetic field detecting operation of a mobile terminal according to an embodiment of the present disclosure.

FIG. 9C is a diagram illustrating a magnetic field detecting operation of a mobile terminal according to an embodiment of the present disclosure.

Referring to FIG. 9C, the mobile terminal 100 may detect a nearby magnetic field through a magnetic sensor 111 of the sensor unit. Here, a speaker 20 is disposed in the vehicle, more specifically, in a door of the vehicle, and a magnet 25 (e.g., an electromagnet or a permanent magnet) is included in the speaker 20. Therefore, if the user that carries the mobile terminal 100 enters the vehicle, the magnetic sensor 111 may detect at least a certain level of a magnetic value or a magnetic field change of a specific pattern due to the magnet 25 of the speaker 20 disposed in the door of the vehicle.

Figure 9D:
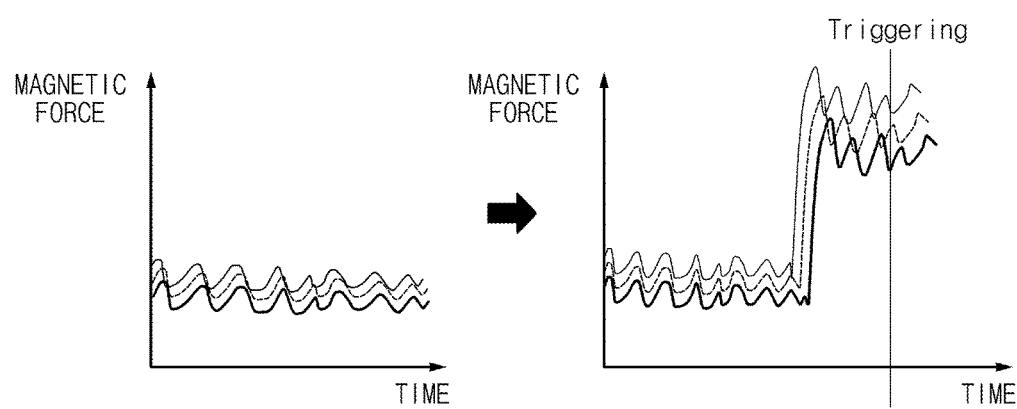
FIG. 9D is a graph of a magnetic force versus time in the case where a magnetic field is detected by a magnetic sensor according to an embodiment of the present disclosure.

FIG. 9D is a graph of a magnetic force versus time in the case where a magnetic field is detected by a magnetic sensor according to an embodiment of the present disclosure.

Referring to FIG. 9D, while the user is not present in the vehicle, a magnetic force detected by the magnetic sensor may be less than a certain level. If the user enters the vehicle, the magnetic force around the mobile terminal 100 is increased by the magnet 25 of the speaker 20, and the magnetic sensor 111 detects a magnetic field with at least a certain intensity.

Here, if a predefined magnetic field is detected as illustrated in FIG. 9D after the motion pattern of entering a vehicle is detected as illustrated in FIG. 9A, the mobile terminal 100 may determine that the user has entered the vehicle so that a vehicle application is automatically executed, or a predefined first function is activated, or a predefined second function is inactivated.

Figure 9E:
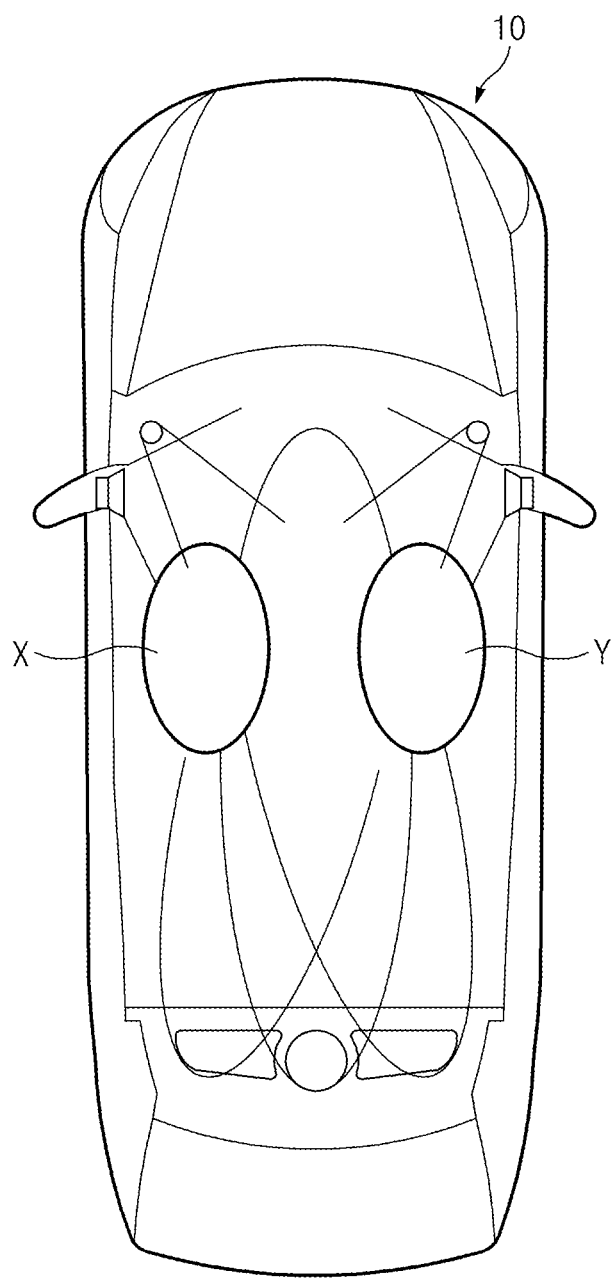
FIG. 9E is a diagram illustrating an in-vehicle position determining operation of a mobile terminal according to an embodiment of the present disclosure.

FIG. 9E is a diagram illustrating an in-vehicle position determining operation of a mobile terminal according to an embodiment of the present disclosure.

Referring to FIG. 9E, if the user enters the vehicle 10, the mobile terminal may determine which one of a driver seat X and a passenger seat Y the user is positioned on, based on at least one of the magnetic field change detected by the magnetic sensor, the direction of entering the vehicle detected by the acceleration sensor, the tilt direction detected by the inertia sensor, and the noise direction detected by the microphone. Furthermore, the mobile terminal may determine which one of the driver seat X and the passenger seat Y the user is positioned on, based on predetermined motion information provided from a wrist wearable device, such as information on a motion and/or a direction of a hand that closes the door of the vehicle 10. The mobile terminal may also determine which one of the driver seat X and the passenger seat Y the user is positioned on, based on information detected from the electronic device 200 such as the OBD, the car kit, or the like by sensors in the vehicle 10.

If the position of the user is determined as described above, the mobile terminal provides a function corresponding to the position of the user using the vehicle application.

For example, if the user is a driver, the mobile terminal may assign a high security level with respect to the use of information of a vehicle system and the electronic device 200, and may provide a function of associating with a handsfree system of the vehicle. If the user is a passenger seated on a passenger seat, the mobile terminal may assign a low security level with respect to the use of the information of the vehicle system and the electronic device 200 to restrict the use of a specific function and/or information, and may inactivate the function of associating with the handsfree system of the vehicle 10 so as not to provide the function to the passenger.

Figure 9F:
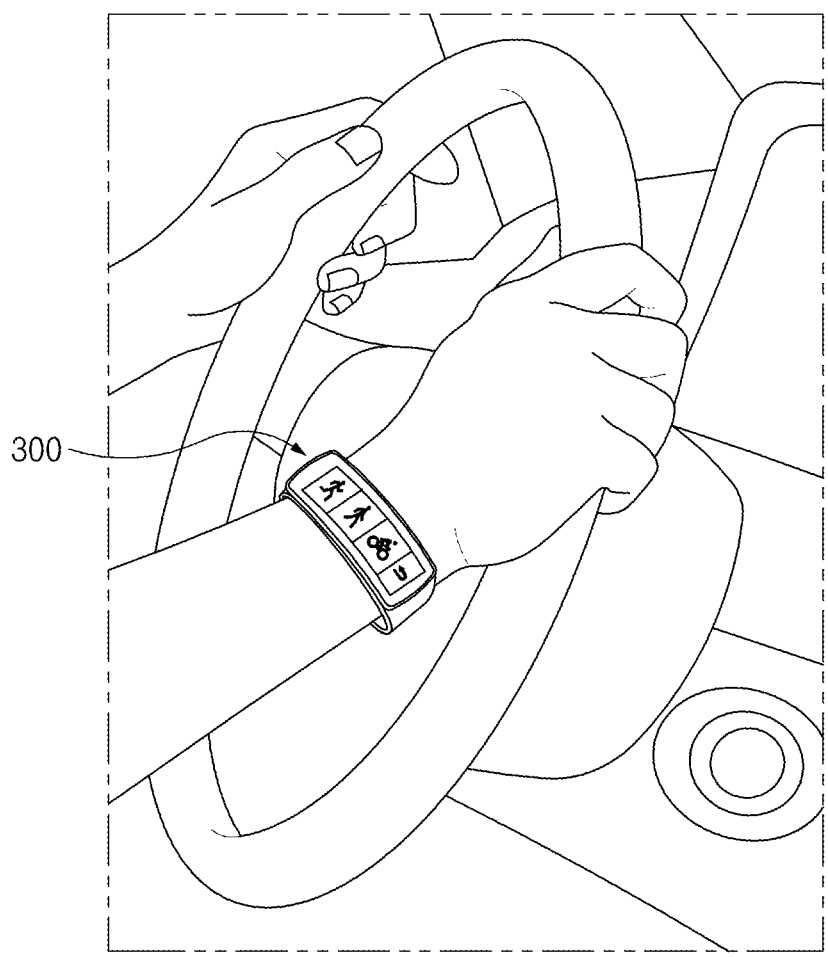
FIG. 9F is a diagram illustrating operation of a wearable device according to an embodiment of the present disclosure.

FIG. 9F is a diagram illustrating operation of a wearable device according to an embodiment of the present disclosure.

Referring to FIG. 9F, the mobile terminal may share information detected by a paired external device, for example, the wearable device 300, while communicating with the wearable device 300.

For example, if the user enters and drives the vehicle, the wearable device 300 may detect a motion of the user while the vehicle is driven, and may provide detected motion information to the mobile terminal in real time or at a certain period. In this case, the mobile terminal may detect a state of the user or a dangerous state due to a specific motion based on the motion information provided from the wearable device 300 while the vehicle is driven.

If the user alights from the vehicle without carrying the mobile terminal after driving the vehicle, a strength of a signal between the wearable device 300 and the mobile terminal is changed. Therefore, the mobile terminal may use the wearable device 300 to perform a function of mobile terminal notification (e.g., notification on leaving the mobile terminal 100 in the vehicle 10).

Figure 10:
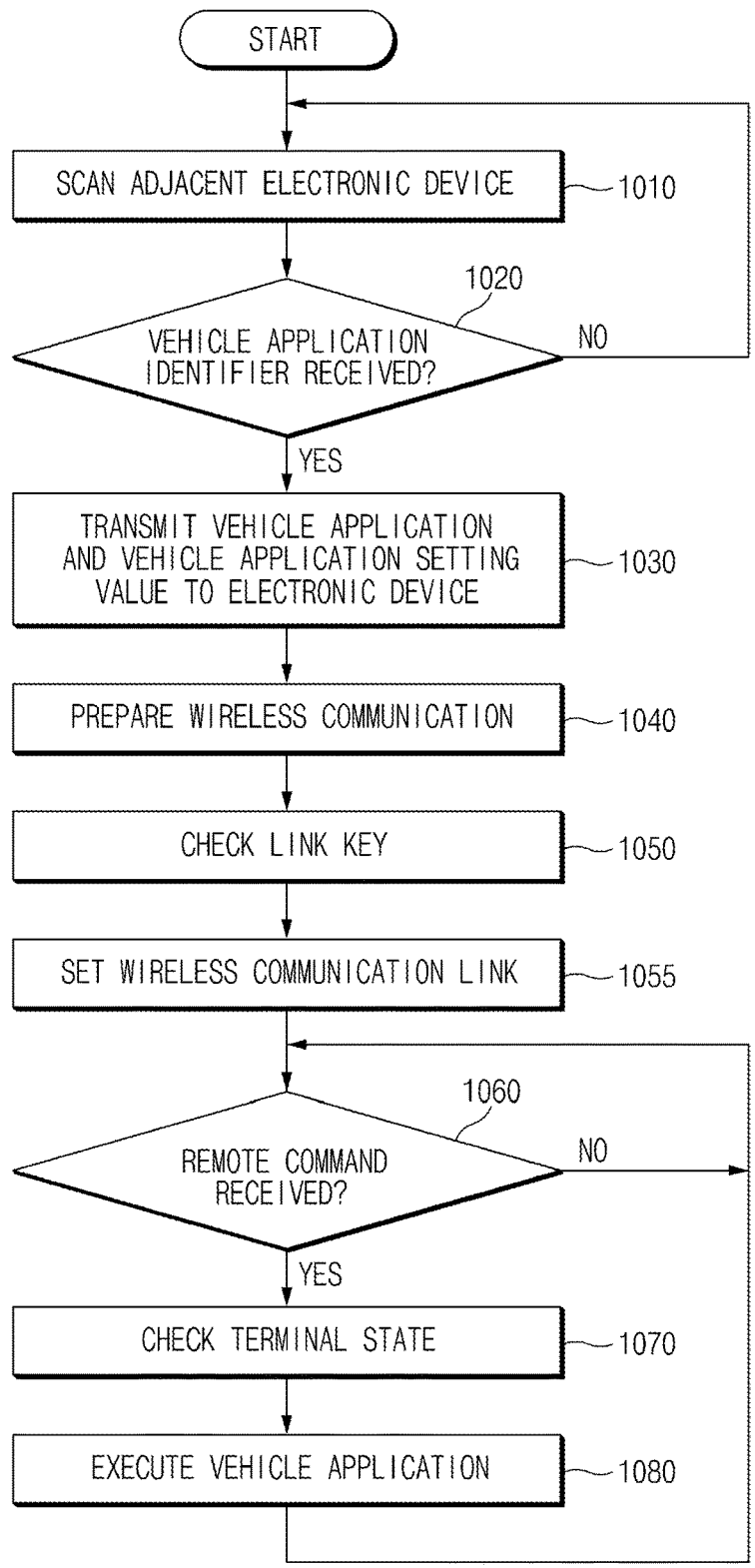
FIG. 10 is a flowchart illustrating a method of driving a vehicle application of a mobile terminal according to a fifth embodiment of the present disclosure.

FIG. 10 is a flowchart illustrating a method of driving a vehicle application of a mobile terminal according to a fifth embodiment of the present disclosure.

Referring to FIG. 10, in operation 1010, the mobile terminal may scan an external electronic device to receive a beacon broadcast from the external electronic device. Here, if the mobile terminal receives a vehicle application identifier in operation 2010, the mobile terminal may identify a vehicle application installed in the mobile terminal based on the vehicle application identifier received in operation 1020. The mobile terminal may transmit, to the electronic device, a vehicle application setting value and a vehicle identifier registered in the vehicle application in operation 1030.

Thereafter, the mobile terminal may prepare for wireless communication in operation 1040, may check a link key received from the electronic device in operation 1050, and may set a communication link in operation 1055. If the setting of the communication link is completed in operation 1055 and a remote command is received from the electronic device in operation 1060, the mobile terminal may check a state of the mobile terminal in operation 1070, and may execute the vehicle application in operation 1080. Here, the mobile terminal may repeatedly perform operations 1060 to 1080 until the execution of the vehicle application is terminated or the communication connection to the electronic device is released.

Figure 11:
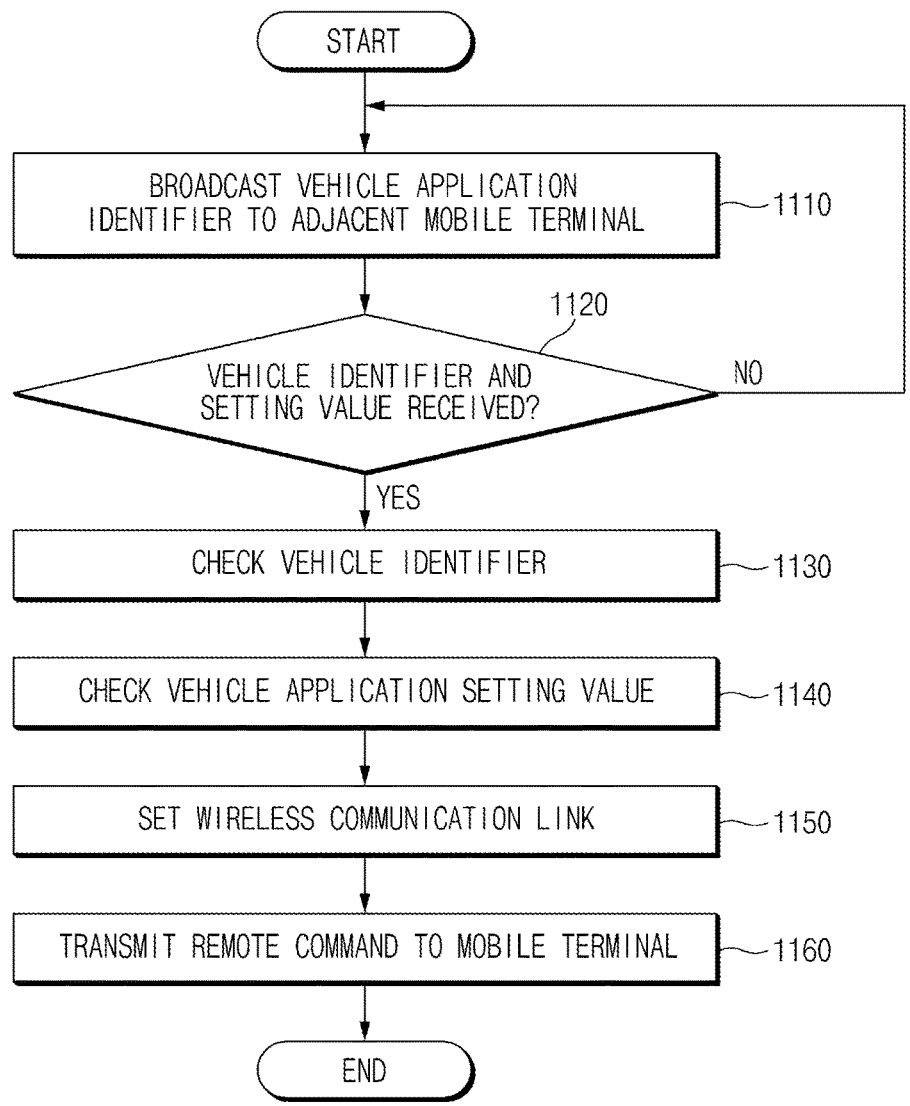
FIG. 11 is a flowchart illustrating a method of driving a vehicle application of a mobile terminal according to a sixth embodiment of the present disclosure.

FIG. 11 is a flowchart illustrating a method of driving a vehicle application of a mobile terminal according to a sixth embodiment of the present disclosure.

Referring to FIG. 11, an electronic device may broadcast a beacon including a vehicle application identifier (e.g., a service UUID) to an external mobile terminal in operation 1110. If a vehicle application setting value and a vehicle identifier corresponding to the vehicle application identifier included in the beacon are received from the mobile terminal in operation 1120, the electronic device may check the vehicle identifier received from the mobile terminal in operation 1130. Here, the electronic device may compare the vehicle identifier received from the mobile terminal with the vehicle identifier of the vehicle provided with the electronic device to determine whether the vehicle is a vehicle of the user of the mobile terminal.

Furthermore, the electronic device may check the vehicle application setting value received from the mobile terminal to recognize an automatic execution function set in the vehicle application of the mobile terminal in operation 1140. Here, the electronic device may generate a command for controlling operation of the vehicle application based on the vehicle identifier and the vehicle application setting value.

The electronic device may set a wireless communication link for transmitting/receiving signals between the electronic device and the mobile terminal in operation 1050, and, if the setting of the wireless communication link is completed, the electronic device may transmit a remote command on the execution of the vehicle application to the mobile terminal in operation 1160.

Figure 12:
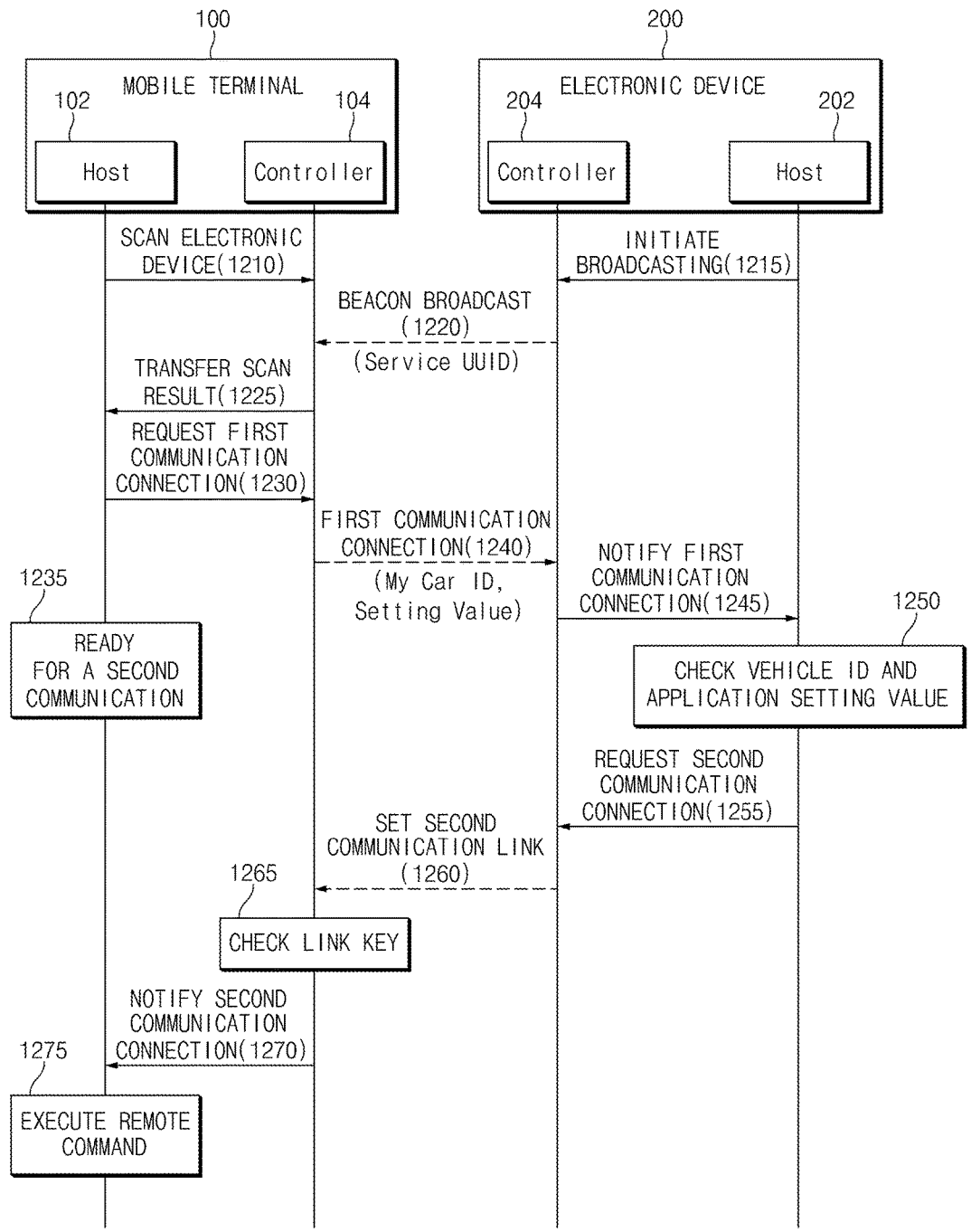
FIG. 12 is a flowchart illustrating a method of driving a vehicle application of a mobile terminal according to a seventh embodiment of the present disclosure.

FIG. 12 is a flowchart illustrating a method of driving a vehicle application of a mobile terminal according to a seventh embodiment of the present disclosure.

Referring to FIG. 12, a flow of operation of a system including the mobile terminal 100 and the electronic device 200 is illustrated. In FIG. 12, a host 102 of the mobile terminal 100 may correspond to the second control unit 170 of FIG. 2A and a controller 104 may correspond to the first control unit 160 of FIG. 2A. Furthermore, the electronic device 200 may correspond to at least one of the OBD and the car kit. Here, a host 202 of the electronic device 200 may correspond to the second control unit 230 of FIG. 2B and a controller 204 may correspond to the first control unit 220 of FIG. 2B.

Referring to FIG. 12, the host 102 of the mobile terminal 100 may scan the external electronic device 200 in operation 1210. Here, the controller 104 of the mobile terminal 100 may scan the external electronic device 200 according to an instruction of the host 102. The host 202 of the electronic device 200 may command initiation of broadcasting of a beacon in operation 1215, and the controller 204 of the electronic device 200 may broadcast a beacon including a vehicle application identifier (e.g., a service UUID) to the external mobile terminal 100 according to an instruction of the host 202 in operation 1220.

If the beacon including the vehicle application identifier is received in operation 1220, the controller 104 of the mobile terminal 100 may transfer a result of scanning the electronic device 200 to the host 102 of the mobile terminal 100 in operation 1225. Here, the mobile terminal 100 may request a first communication connection to the electronic device 200 based on the result of scanning the electronic device 200 in operation 1230, and may prepare for second communication in operation 1235. The controller 104 of the mobile terminal 100 may respond to the beacon of operation 1220 with a vehicle ID (e.g., MyCar ID) and a vehicle application setting value according to a request from the host 102 so as to establish the first communication connection to the electronic device 200 in operation 1240.

The controller 204 of the electronic device 200 may notify the host 202 of the establishment of the first communication connection to the mobile terminal 100 in operation 1245, and may transfer, to the host 202, the vehicle ID and the vehicle application setting value received from the mobile terminal 100 in operation 1240. The host 202 of the electronic device 200 may check the vehicle ID and the vehicle application setting value received from the mobile terminal 100 in operation 1250. For example, the host 202 of the electronic device 200 may compare the vehicle ID received from the mobile terminal 100 with a vehicle identifier of a vehicle provided with the electronic device 200 to determine whether the vehicle is a vehicle of the user of the mobile terminal 100, and may check the vehicle application setting value received from the mobile terminal 100 to recognize an automatic execution function set in the vehicle application of the mobile terminal 100. Here, the electronic device 200 may generate a command for controlling operation of the vehicle application based on the vehicle ID and the vehicle application setting value.

The host 202 of the electronic device 200 may send, to the controller 204, a request for a second communication connection to the mobile terminal 100 in operation 1255, and the controller 204 may set a wireless communication link for transmitting/receiving signals between the electronic device 200 and the mobile terminal 100 in operation 1260. The controller 104 of the mobile terminal 100 may check a link key received from the electronic device 200 to complete setting of the communication link to the electronic device 200 in operation 1265, and may notify the host 102 of the establishment of the second communication connection in operation 1270.

Thereafter, if a remote command on a function of the vehicle application is received from the electronic device 200 through the second communication link set in operation 1260, the host 102 of the mobile terminal 100 may execute the remote command in operation 1275.

Here, operations 1220 and 1240 may be performed using a first wireless communication method such as BLE, and operation 1260 may be performed using a second wireless communication method different from the first wireless communication method, such as Bluetooth. All of operations 1220, 1240, and 1260 may be performed using any one of the first and second wireless communication methods.

Figure 13:
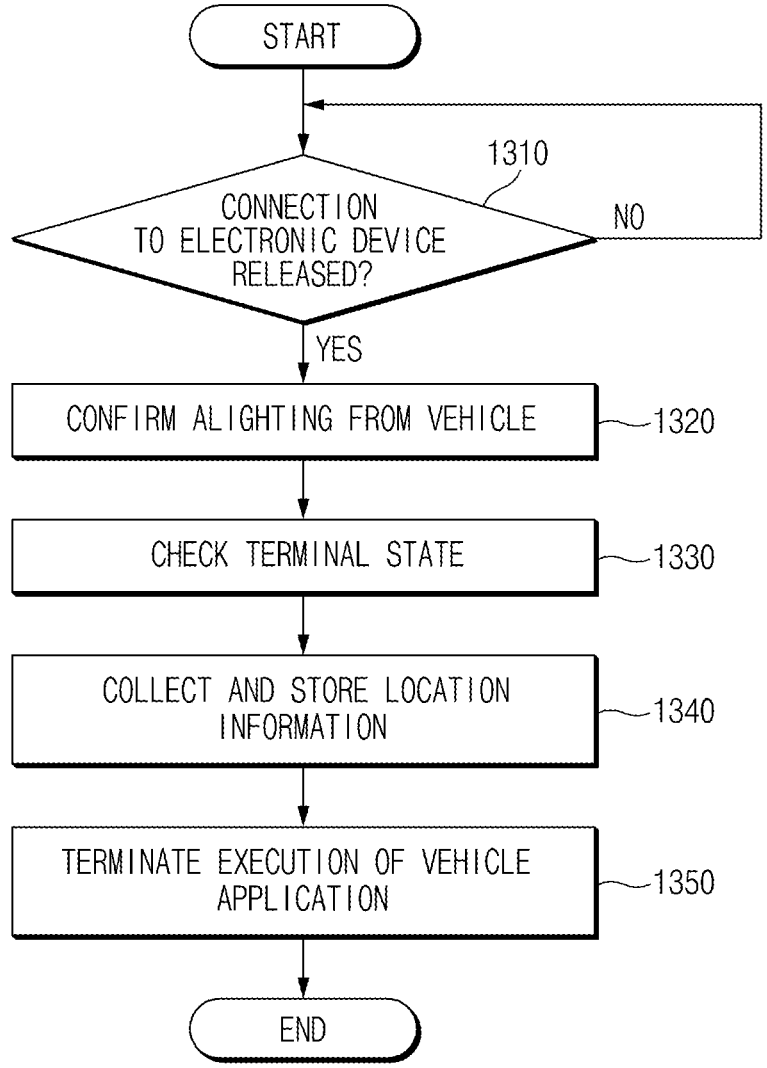
FIG. 13 is a flowchart illustrating a method of terminating a vehicle application of a mobile terminal according to an eighth embodiment of the present disclosure.

FIG. 13 is a flowchart illustrating a method of terminating a vehicle application of a mobile terminal according to an eighth embodiment of the present disclosure.

Referring to FIG. 13, the mobile terminal may monitor a communication unit through a first control unit while the vehicle application is executed. If a connection to an electronic device through the communication unit is released in operation 1310, the mobile terminal may determine that a user that carries the mobile terminal has alighted from a vehicle in operation 1320.

In this case, the mobile terminal may check a terminal state in operation 1330, and may collect and store location information of a corresponding time point in operation 1340. Thereafter, the mobile terminal may terminate the execution of the vehicle application in operation 1350. Here, if it is determined that the user has alighted from the vehicle in operation 1320, the mobile terminal may automatically perform operations 1330 to 1350.

If the condition of operation 1310 is not satisfied, the mobile terminal may determine that the user has not alighted from the vehicle and may repeatedly perform operation 1310.

Figure 14:
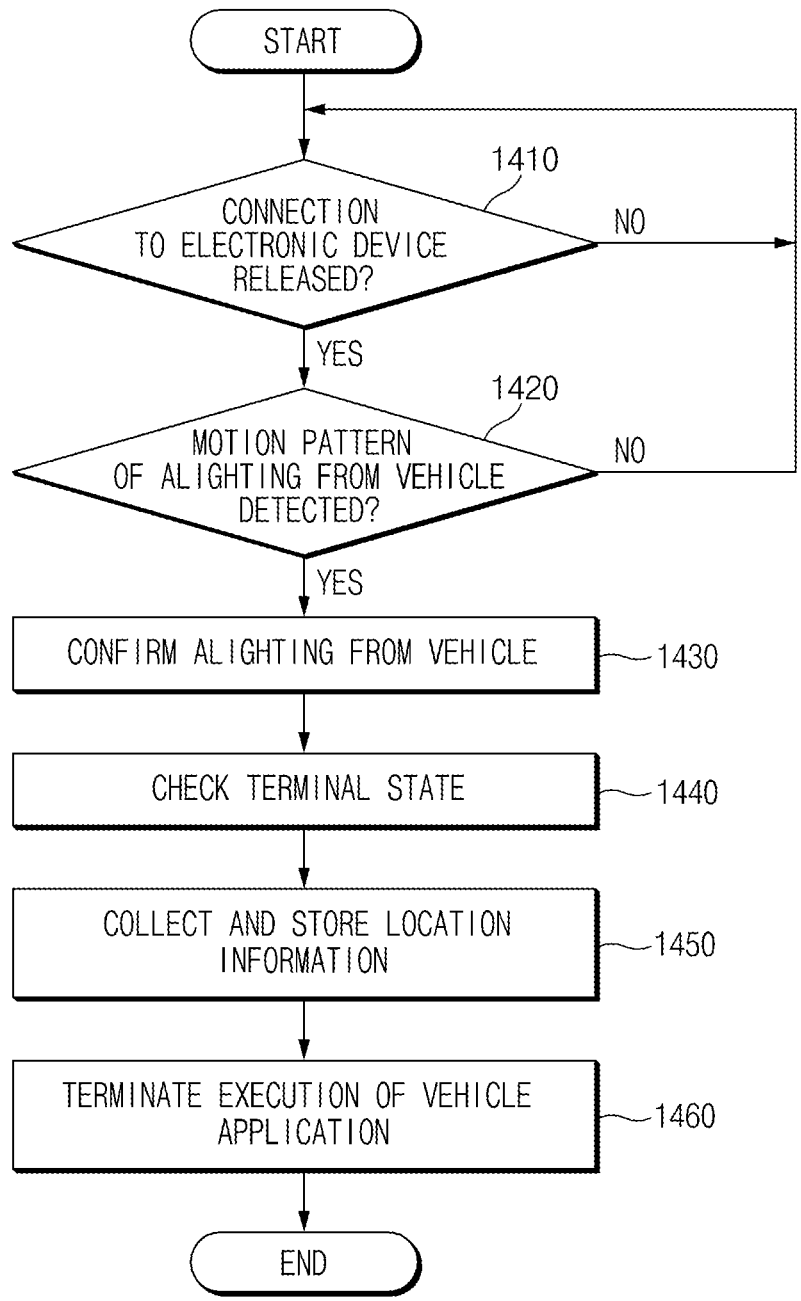
FIG. 14 is a flowchart illustrating a method of terminating a vehicle application of a mobile terminal according to a ninth embodiment of the present disclosure.

FIG. 14 is a flowchart illustrating a method of terminating a vehicle application of a mobile terminal according to a ninth embodiment of the present disclosure.

Referring to FIG. 14, the mobile terminal may monitor a communication unit through a first control unit while the vehicle application is executed. If a connection to an electronic device through the communication unit is released in operation 1410 and a predefined motion pattern of alighting from a vehicle is detected by an acceleration sensor in operation 1420, the mobile terminal may determine that a user that carries the mobile terminal has alighted from a vehicle in operation 1430.

In this case, the mobile terminal may check a terminal state in operation 1440, and may collect and store location information of a corresponding time point in operation 1450. Thereafter, the mobile terminal may terminate the execution of the vehicle application in operation 1460. Here, if it is determined that the user has alighted from the vehicle in operation 1430, the mobile terminal may automatically perform operations 1440 to 1460.

If none of the conditions of operations 1410 and 1420 is satisfied, the mobile terminal may determine that the user has not alighted from the vehicle and may repeatedly perform operations 1410 and 1420.

FIG. 14 illustrates that it is determined whether the user alights from the vehicle based on the connection to the electronic device and the motion pattern of alighting from a vehicle. However, according to another implementation of the method, conditions such as a magnetic field change and/or noise detection may be used in combination with the above-mentioned conditions to determine whether the user alights from the vehicle.

Figure 15:
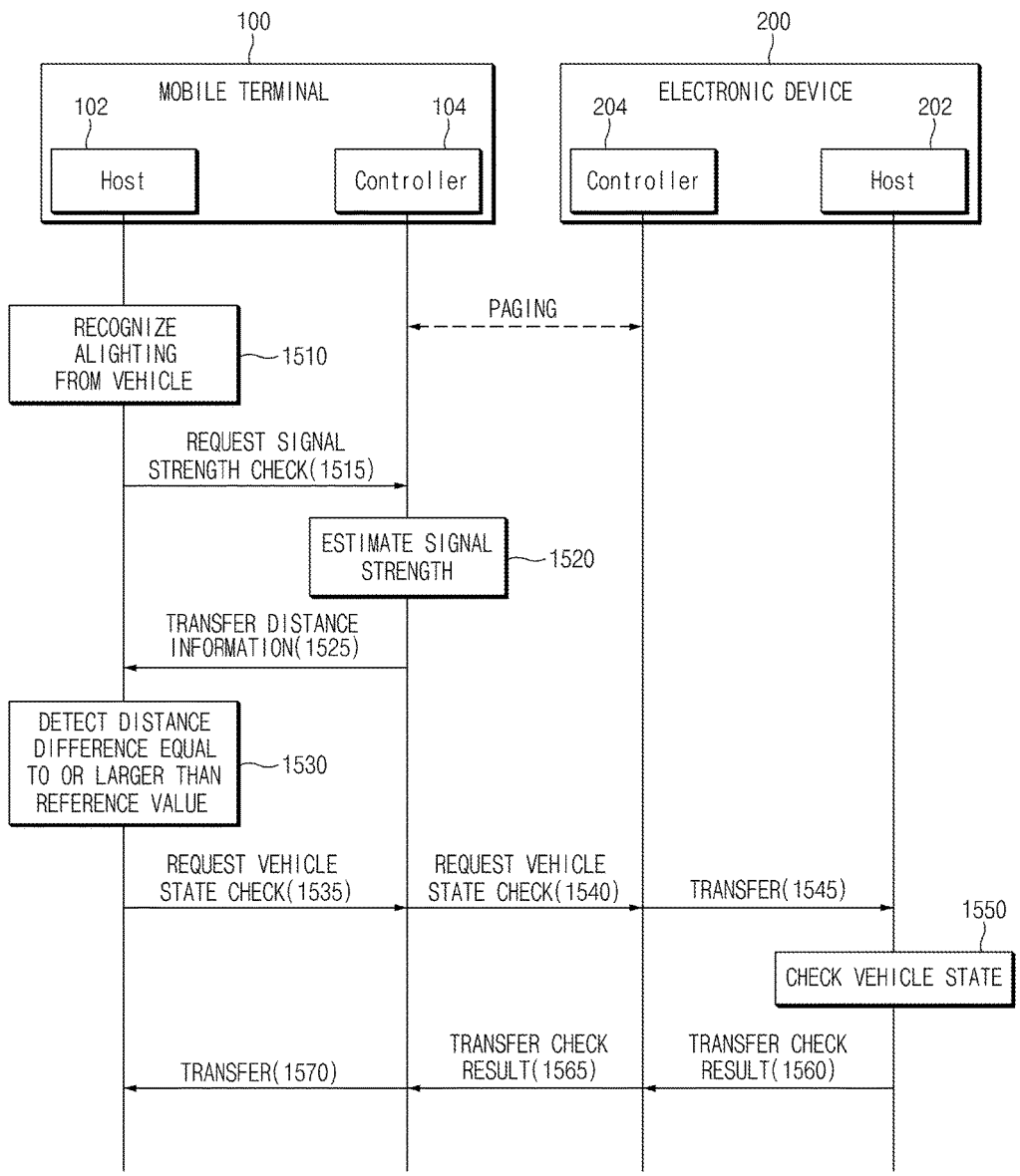
FIG. 15 is a flowchart illustrating a method of terminating a vehicle application of a mobile terminal according to a tenth embodiment of the present disclosure.

FIG. 15 is a flowchart illustrating a method of terminating a vehicle application of a mobile terminal according to a tenth embodiment of the present disclosure.

Referring to FIG. 15, if the host 102 of the mobile terminal 100 recognizes a motion of alighting from a vehicle in operation 1510, the host 102 of the mobile terminal 100 may request a signal strength check from the controller 104 in operation 1515. Here, the controller 104 of the mobile terminal 100 may estimate a signal strength (e.g., an RSSI) between the mobile terminal 100 and the electronic device 200 according to a request of the host 102 and may measure a distance according to a change of the RSSI in operation 1520, and may transfer distance information to the host 102 in operation 1525.

If the host 102 of the mobile terminal 100 detects a distance difference equal to or larger than a reference value between the mobile terminal 100 and the electronic device 200 based on the distance information determined by the controller 104 in operation 1530, the host 102 of the mobile terminal 100 may request a vehicle state check from the controller 104 in operation 1535. In this case, according to a request from the host 102, the controller 104 of the mobile terminal 100 may request the vehicle state check from the electronic device 200 in operation 1540.

If the request for the vehicle state check is received from the mobile terminal 100 in operation 1540, the controller 204 of the electronic device 200 may transfer the request for the vehicle state check to the host 202 in operation 1545, and the host 202 may check a vehicle state according to the request of the mobile terminal 100 in operation 1550. Here, the host 202 of the electronic device 200 may check an opened or closed state of the door of the vehicle, an opened or closed state of the window of the vehicle, a turned on or off state of the light of the vehicle, an ignition-on or off state of the vehicle, a gear state of the vehicle, or the like. If the vehicle state is checked, the host 202 of the electronic device 200 may transfer a result of the vehicle state check to the controller 204 in operation 1560, and the controller 204 may transmit the result of the vehicle state check to the mobile terminal 100 in operation 1565.

Accordingly, the controller 104 of the mobile terminal 100 may transfer the result of the vehicle state check received from the electronic device 200 in operation 1565 to the host 102 in operation 1570. In this case, the host 102 of the mobile terminal 100 may provide, to the user, the result of the vehicle state check received in operation 1570 in the form of a notification. In one embodiment of the present disclosure, the host 102 of the mobile terminal 100 may provide the notification to the user only if the result of the vehicle state check received from the electronic device 200 indicates an abnormality.

A screen configuration according to operation of a mobile terminal is described below.

Figure 16:
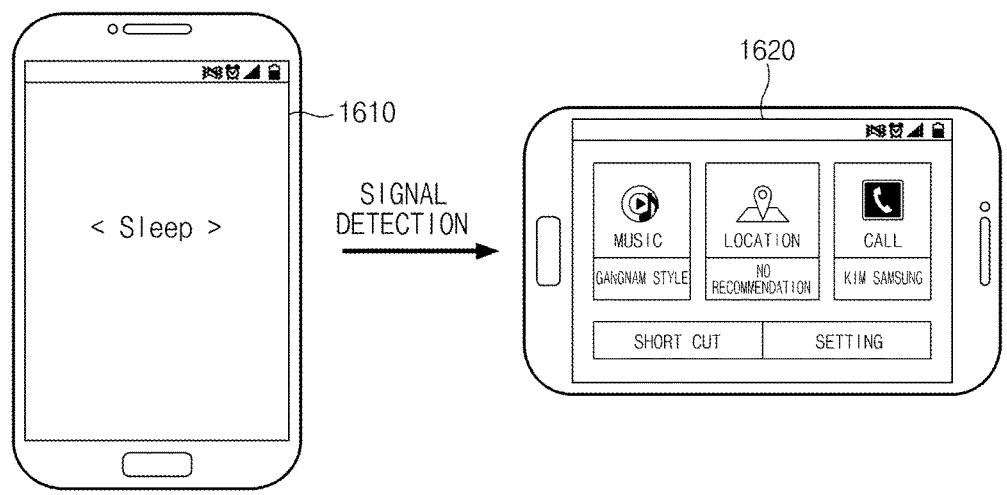
FIG. 16 is a diagram illustrating a driving screen of a vehicle application of a mobile terminal according to an embodiment of the present disclosure.

FIG. 16 is a diagram illustrating a screen of driving a vehicle application of a mobile terminal according to an embodiment of the present disclosure.

Referring to FIG. 16, operation 1610 represents a screen output while the mobile terminal is operated in a sleep mode. Alternatively, the mobile terminal may not output a screen while being operated in the sleep mode.

Thereafter, a vehicle application that supports a vehicle-associated service (e.g., music playback, navigation, making a call, or the like) is automatically executed and an execution screen of the vehicle application may be displayed on a display unit of the mobile terminal as shown in operation 1620, if a signal is detected, wherein the signal indicates that it is determined by sensors (e.g., an acceleration sensor, a magnetic sensor, an inertia sensor, a microphone, and the like) of the mobile terminal and/or a device external to the mobile terminal (e.g., a wearable device, an OBD, a car kit, or the like) that a user that carries the mobile terminal has entered the vehicle.

Figure 17:
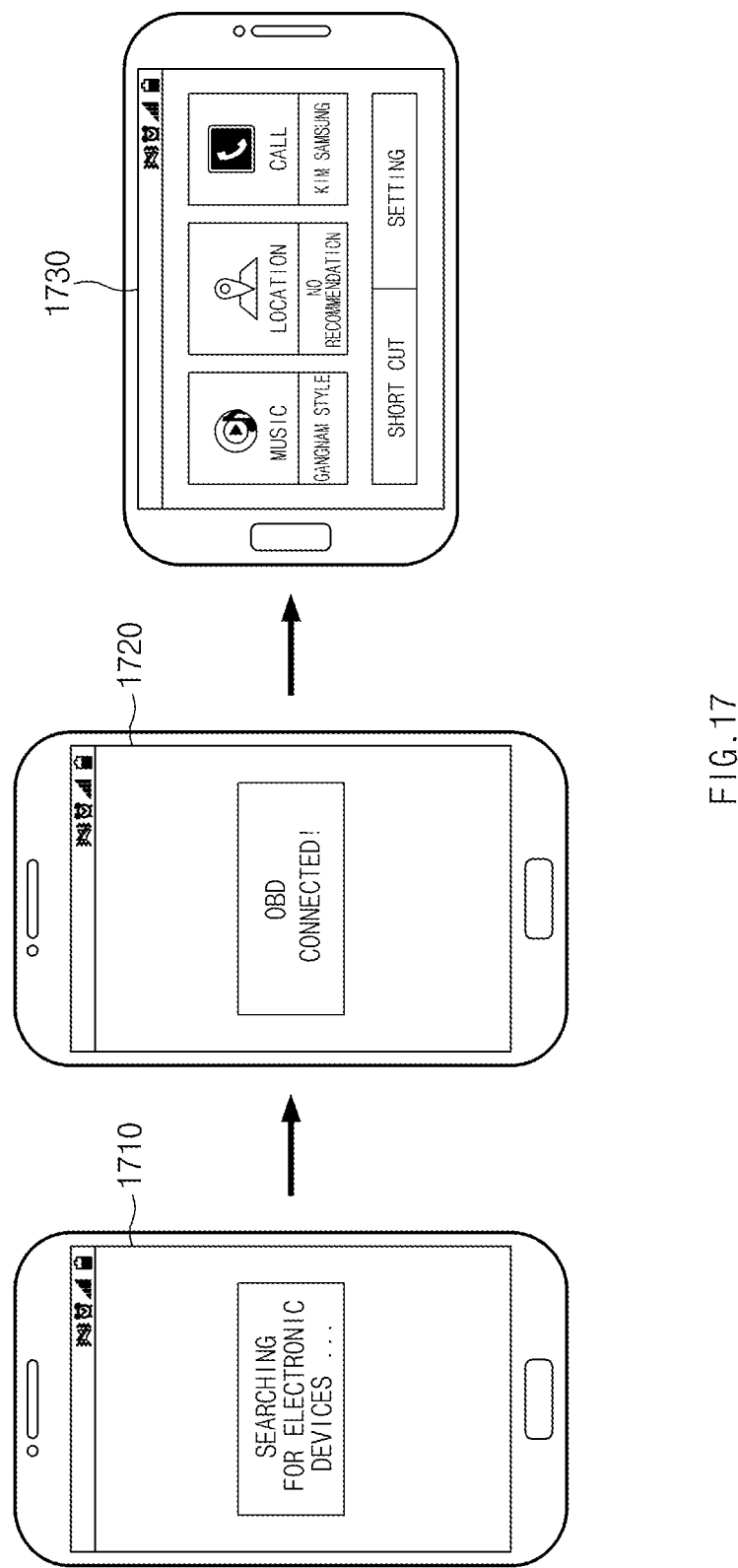
FIG. 17 is a diagram illustrating a driving screen of a vehicle application of a mobile terminal according to an embodiment of the present disclosure.

FIG. 17 is a diagram illustrating a screen of driving a vehicle application of a mobile terminal according to an embodiment of the present disclosure.

Referring to FIG. 17, the mobile terminal may detect entry of the user to a vehicle according to a state of a communication connection to an electronic device provided to the vehicle, such as an OBD, a car kit, or the like, instead of detecting the entry of the user to the vehicle according to a specific motion of the user or a change of a surrounding environment as described above with reference to FIG. 16.

That is, if the mobile terminal is operated in the sleep mode, the mobile terminal may search for external electronic devices using a low-power wireless communication method such as the BLE communication method as shown in operation 1710. However, various communication methods may be used so that the mobile terminal searches for external electronic devices.

If the mobile terminal is connected to an external OBD as a result of searching for electronic devices as shown in operation 1720, the mobile terminal may determine that the user has entered the vehicle. Accordingly, the mobile terminal may automatically execute the vehicle application that supports a vehicle-associated service (e.g., music playback, navigation, making a call, or the like) and may display an execution screen on a display unit of the mobile terminal as shown in operation 1730.

Figure 18:
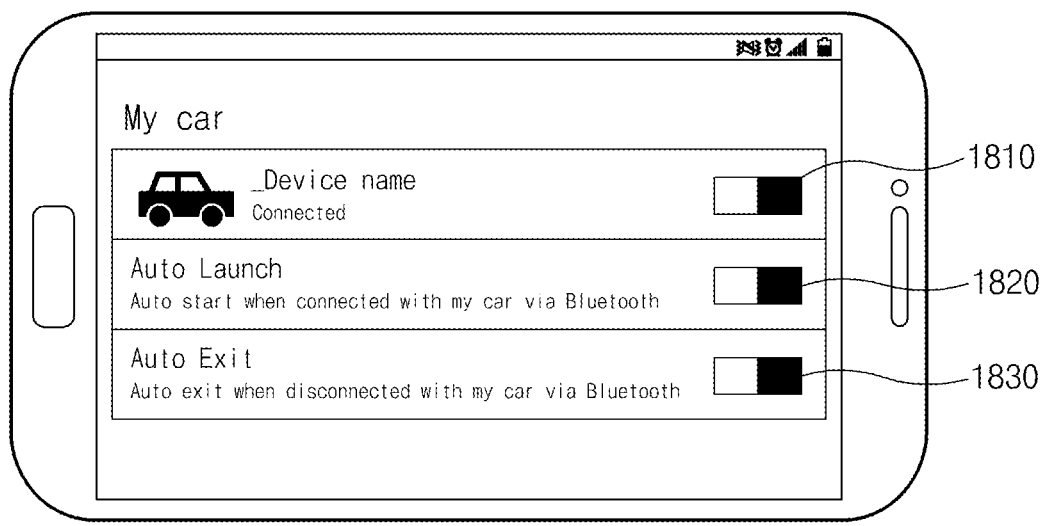
FIG. 18 is a diagram illustrating a setting screen of a vehicle application of a mobile terminal according to an embodiment of the present disclosure.

FIG. 18 is a diagram illustrating a setting screen of a vehicle application of a mobile terminal according to an embodiment of the present disclosure.

Referring to FIG. 18, the setting screen of the vehicle application may display a bar for setting a name of a registered vehicle (e.g., Device name) as shown by reference numeral 1810. Furthermore, the setting screen of the vehicle application may display a bar for setting an option of automatic execution when a Bluetooth communication connection to a registered vehicle is established as shown by reference numeral 1820, and may display a bar for setting an option of automatic termination when a Bluetooth communication connection to a vehicle is released as shown by reference numeral 1830.

In this case, the user may manipulate at least one of the bars of reference numerals 1810, 1820, and 1830 through a touchscreen of the mobile terminal so as to set an automatic execution function or the like of the vehicle application. Here, a vehicle application setting value set by the user may be provided to an electronic device according to a vehicle application identifier received from the electronic device together with a beacon.

Figure 19:
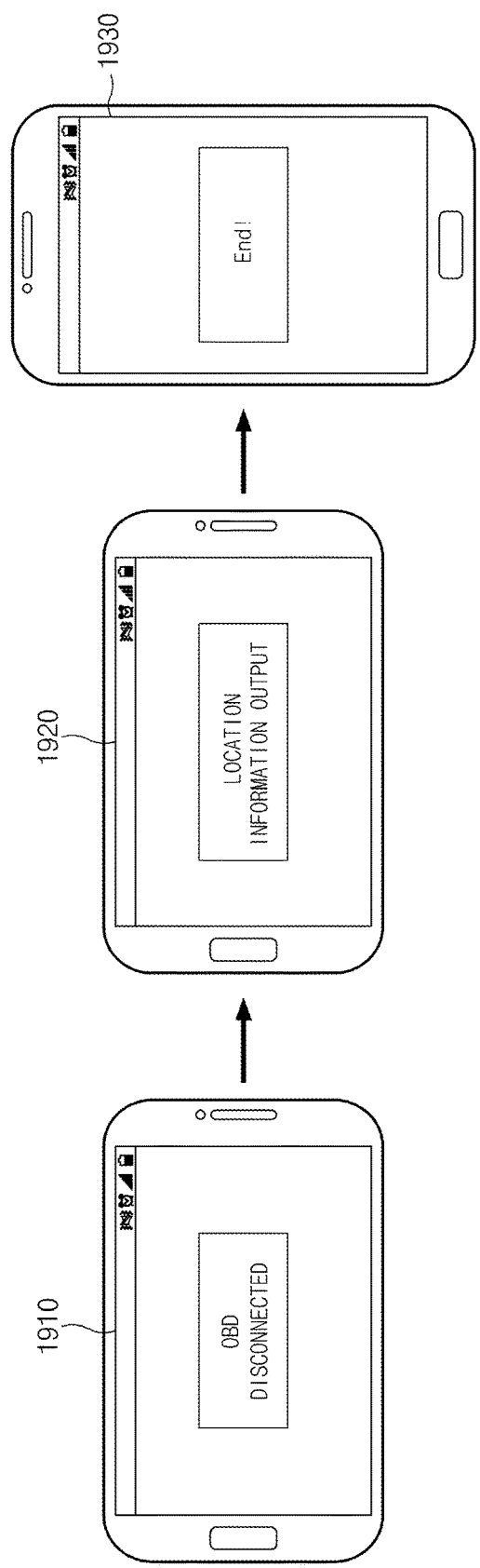
FIG. 19 is a diagram illustrating a termination screen of a vehicle application of a mobile terminal according to an embodiment of the present disclosure.

FIG. 19 is a diagram illustrating a termination screen of a vehicle application of a mobile terminal according to an embodiment of the present disclosure.

Referring to FIG. 19, the mobile terminal may detect alighting of a user from a vehicle according to a state of a communication connection to an electronic device provided to the vehicle, such as an OBD, a car kit, or the like.

That is, if a communication connection to an external device, for example, the OBD, is released while the vehicle application is executed, the mobile terminal may display, on a screen, a message of notifying the release of the communication connection to the OBD as shown in operation 1910.

Location information of a corresponding time point, such as GPS coordinate information, altitude information, or the like, may be collected and stored using a GPS module or the like of the mobile terminal, and the information may be output as shown in operation 1920.

If storing of the location information is completed, the mobile terminal may automatically terminate the execution of the vehicle application. Here, the mobile terminal may display, on a screen, a message of notifying the termination of the execution of the vehicle application as shown in operation 1930.

Figure 20:
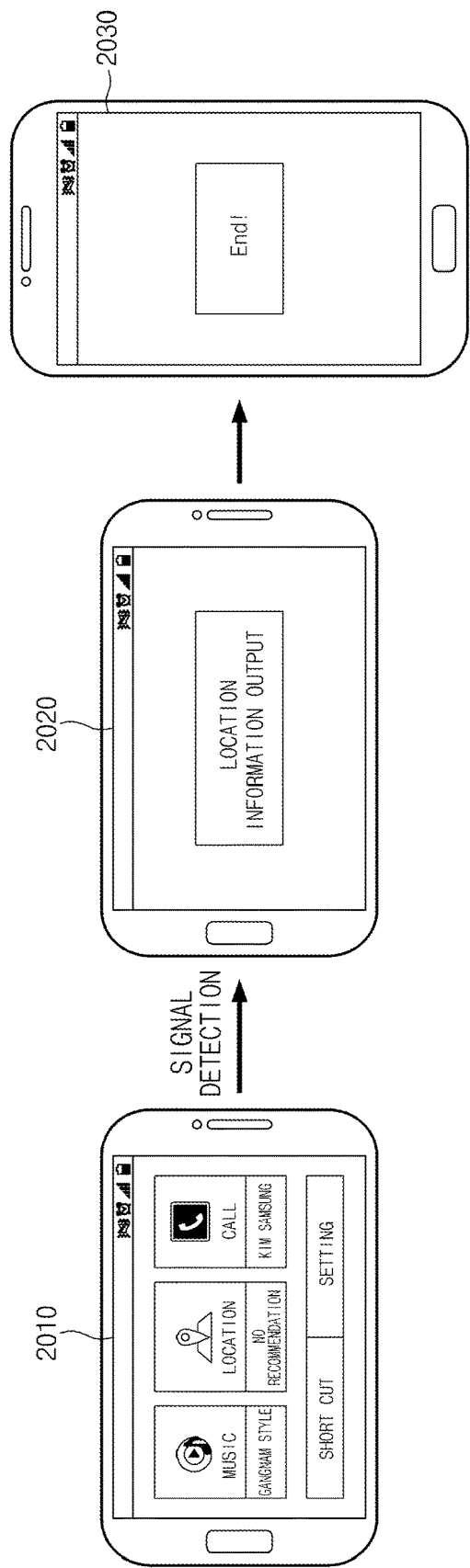
FIG. 20 is a diagram illustrating a termination screen of a vehicle application of a mobile terminal according to an embodiment of the present disclosure.

FIG. 20 is a diagram illustrating a termination screen of a vehicle application of a mobile terminal according to an embodiment of the present disclosure.

Referring to FIG. 20, the mobile terminal may display an execution screen of the vehicle application while the vehicle application is executed as shown in operation 2010. The mobile terminal may collect and store location information of a corresponding time point, such as GPS coordinate information, altitude information, or the like, using a GPS module or the like of the mobile terminal, and may output the information as shown in operation 2020, if a signal is detected while the vehicle application is executed, wherein the signal indicates that it is determined by sensors (e.g., an acceleration sensor, a magnetic sensor, an inertia sensor, a microphone, and the like) of the mobile terminal and/or a device external to the mobile terminal (e.g., a wearable device, an OBD, a car kit, or the like) that a user that carries the mobile terminal has alighted from the vehicle.

If storing of the location information is completed, the mobile terminal may automatically terminate the execution of the vehicle application. Here, the mobile terminal may display, on a screen, a message of notifying the termination of the execution of the vehicle application as shown in operation 2030.

Figure 21:
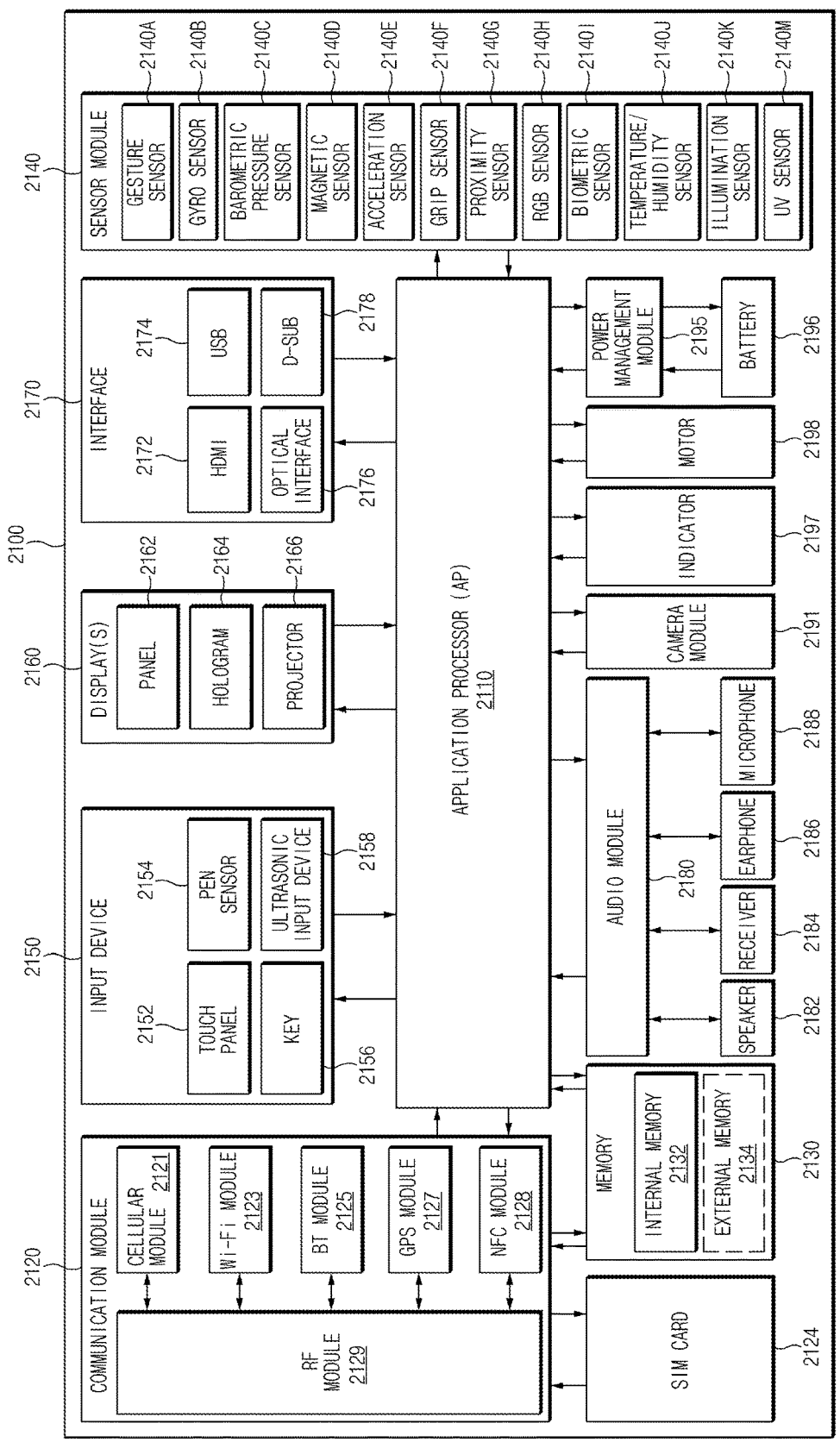
FIG. 21 is a block diagram illustrating a hardware structure of a mobile terminal according to various embodiments of the present disclosure.

FIG. 21 is a block diagram illustrating a hardware structure of a mobile terminal according to various embodiments of the present disclosure.

Referring to FIG. 21, a mobile terminal 2100 may include at least one of at least one AP 2110, a communication module 2120, a subscriber identification module (SIM) card 2124, a memory 2130, a sensor module 2140, an input device 2150, a display 2160, an interface 2170, an audio module 2180, a camera module 2191, a power management module 2195, a battery 2196, an indicator 2197, or a motor 2198.

The AP 2110 may run an operating system or an application program so as to control a plurality of hardware or software elements connected to the AP 2110, and may process various data including multimedia data and may perform an operation thereon. The AP 2110 may be implemented with, for example, a system on chip (SoC). According to an embodiment of the present disclosure, the AP 2110 may further include a graphic processing unit (GPU).

The communication module 2120 may perform data transmission/reception for communication between the mobile terminal 2100 and other mobile terminals connected thereto through a network. According to an embodiment of the present disclosure, the communication module 2120 may include a cellular module 2121, a Wi-Fi module 2123, a BT module 2125, a GPS module 2127, a Near Field Communication (NFC) module 2128, and a radio frequency (RF) module 2129.

The cellular module 2121 may provide a voice call service, a video call service, a text message service, or an Internet service through a telecommunications network (e.g., a Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro) or Global System for Mobile Communications (GSM) network). Furthermore, the cellular module 2121 may identify and authenticate mobile terminals in the telecommunications network using, for example, a SIM (e.g., the SIM card 2124). According to an embodiment of the present disclosure, the cellular module 2121 may perform at least a part of functions provided by the AP 2110. For example, the cellular module 2121 may perform at least a part of a multimedia control function.

According to an embodiment of the present disclosure, the cellular module 2121 may include a communication processor (CP). The cellular module 2121 may be implemented with, for example, an SoC. Although FIG. 21 illustrates that the cellular module 2121 (e.g., a CP), the memory 2130, and the power management module 2195 are separated from the AP 2110, the AP 2110 may include at least a part of the foregoing elements (e.g., the cellular module 2121), according to an embodiment of the present disclosure.

According to an embodiment of the present disclosure, the AP 2110 or the cellular module 2121 (e.g., a CP) may load, on a volatile memory, a command or data received from nonvolatile memories connected to the AP 210 and the cellular module 221 respectively or at least one of other elements, so as to process the command or data. Furthermore, the AP 2110 or the cellular module 2121 may store, in the nonvolatile memory, data received from or generated by at least one of the other elements.

Each of the Wi-Fi module 2123, the BT module 2125, the GPS module 2127, and the NFC module 2128 may include, for example, a processor for processing data transmitted/received through the modules. FIG. 21 illustrates that the cellular module 2121, the Wi-Fi module 2123, the BT module 2125, the GPS module 2127, and the NFC module 2128 are separate blocks. However, according to an embodiment of the present disclosure, at least a part (e.g., two or more) of the cellular module 2121, the Wi-Fi module 2123, the BT module 2125, the GPS module 2127, and the NFC module 2128 may be included in a single integrated chip (IC) or IC package. For example, at least a part of processors corresponding to the cellular module 2121, the Wi-Fi module 2123, the BT module 2125, the GPS module 2127, and the NFC module 2128 respectively (e.g., a CP corresponding to the cellular module 2121 and a Wi-Fi processor corresponding to the Wi-Fi module 2123) may be implemented with a single SoC.

The RF module 2129 may transmit/receive data, for example, may transmit/receive RF signals. Although not illustrated, for example, a transceiver, a power amp module (PAM), a frequency filter or a low noise amplifier (LNA) may be included in the RF module 2129. Furthermore, the RF module 2129 may further include a component such as a conductor or a wire for transmitting/receiving free-space electromagnetic waves in a wireless communication system. FIG. 21 illustrates that the cellular module 2121, the Wi-Fi module 2123, the BT module 2125, the GPS module 2127, and the NFC module 2128 share the single RF module 2129. However, according to an embodiment of the present disclosure, at least one of the cellular module 2121, the Wi-Fi module 2123, the BT module 2125, the GPS module 2127, or the NFC module 2128 may transmit/receive RF signals through an additional RF module.

The SIM card 2124 may include a subscriber identification module, and may be inserted into a slot formed at a specific location of the mobile terminal. The SIM card 2124 may include unique identification information (e.g., an integrated circuit card identifier (ICCID)) or subscriber information (e.g., international mobile subscriber identity (IMSI)).

The memory 2130 may include an internal memory 2132 or an external memory 2134. The internal memory 2132 may include at least one of a volatile memory (e.g., a dynamic random access memory (DRAM), a static RAM (SRAM) or a synchronous dynamic RAM (SDRAM)) or a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the internal memory 2132 may be a solid state drive (SSD). The external memory 2134 may include a flash drive, for example, compact flash (CF), secure digital (SD), Micro-SD, Mini-SD, extreme digital (xD), a memory stick, or the like. The external memory 2134 may be functionally connected to the mobile terminal 2100 through various interfaces. According to an embodiment of the present disclosure, the mobile terminal 2100 may further include a storage device (or a storage medium) such as a hard drive.

The sensor module 2140 may measure physical quantity or detect an operation state of the mobile terminal 2100 so as to convert measured or detected information into an electrical signal. The sensor module 2140 may include, for example, at least one of a gesture sensor 2140A, a gyro sensor 2140B, a barometric pressure sensor 2140C, a magnetic sensor 2140D, an acceleration sensor 2140E, a grip sensor 2140F, a proximity sensor 2140G, a color sensor 2140H (e.g., a red/green/blue (RGB) sensor), a biometric sensor 2140I, a temperature/humidity sensor 2140J, an illumination sensor 2140K, or an ultraviolet (UV) sensor 2140M. Additionally or alternatively, the sensor module 2140 may include, for example, (not shown) an olfactory sensor (E-nose sensor), an electromyography (EMG) sensor, an electroencephalogram (EEG) sensor, an electrocardiogram (ECG) sensor, an infrared (IR) sensor, an iris recognition sensor, a fingerprint sensor, or the like. The sensor module 2140 may further include a control circuit for controlling at least one sensor included therein.

The input device 2150 may include a touch panel 2152, a (digital) pen sensor 2154, a key 2156, or an ultrasonic input device 2158. The touch panel 2152 may recognize a touch input using at least one of capacitive, resistive, IR, and ultraviolet sensing methods. The touch panel 2152 may further include a control circuit. In the case of using the capacitive sensing method, a physical contact recognition or proximity recognition is allowed. The touch panel 2152 may further include a tactile layer. In this case, the touch panel 2152 may provide tactile reaction to a user.

The (digital) pen sensor 2154 may be implemented in a similar or same manner as the method of receiving a touch input of a user or may be implemented using an additional sheet for recognition. The key 2156 may include, for example, a physical button, an optical button, or a keypad. The ultrasonic input device 2158, which is an input device for generating an ultrasonic signal, may enable the mobile terminal 2100 to sense a sound wave through a microphone (e.g., a microphone 2188) so as to identify data, wherein the ultrasonic input device 2158 is capable of wireless recognition. According to an embodiment of the present disclosure, the mobile terminal 2100 may use the communication module 2120 so as to receive a user input from an external device (e.g., a computer or a server) connected to the communication module 2120.

The display 2160 may include a panel 2162, a hologram device 2164, or a projector 2166. The panel 2162 may be, for example, a LCD, an AMOLED display, or the like. The panel 2162 may be, for example, flexible, transparent or wearable. The panel 2162 and the touch panel 2152 may be integrated into a single module. The hologram device 2164 may display a stereoscopic image in a space using a light interference phenomenon. The projector 2166 may project light onto a screen so as to display an image. The screen may be disposed inside or outside of the mobile terminal 2100. According to an embodiment of the present disclosure, the display 2160 may further include a control circuit for controlling the panel 2162, the hologram device 2164, or the projector 2166.

The interface 2170 may include, for example, a high definition multimedia interface (HDMI) 2172, a universal serial bus (USB) 2174, an optical interface 2176, or a D-subminiature 2178. Additionally or alternatively, the interface 2170 may include, for example, a mobile high-definition link (MHL) interface, a SD card/multi-media card (MMC) interface, or an infrared data association (IrDA) interface.

The audio module 2180 may convert a sound into an electrical signal or vice versa. The audio module 2180 may process sound information input or output through a speaker 2182, a receiver 2184, an earphone 2186, or the microphone 2188.

According to an embodiment of the present disclosure, the camera module 2191 for shooting a still image or a video may include at least one image sensor (e.g., a front sensor or a rear sensor), a lens (not shown), an image signal processor (ISP) (not shown), or a flash (e.g., an LED or a xenon lamp) (not shown).

The power management module 2195 may manage power of the mobile terminal 2100. Although not illustrated, a power management integrated circuit (PMIC), a charger IC, or a battery or fuel gauge may be included in the power management module 2195.

The PMIC may be mounted on an integrated circuit or an SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, a rectifier, or the like.

The battery gauge may measure, for example, a remaining capacity of the battery 2196 and a voltage, current or temperature thereof while the battery is charged. The battery 2196 may store or generate electricity, and may supply power to the mobile terminal 2100 using the stored or generated electricity. The battery 2196 may include, for example, a rechargeable battery or a solar battery.

The indicator 2197 may include a specific state of the mobile terminal 2100 or a part thereof (e.g., the AP 2110), such as a booting state, a message state, or a charging state. The motor 2198 may convert an electrical signal into a mechanical vibration. Although not illustrated, a processing device (e.g., a GPU) for supporting a mobile TV may be included in the mobile terminal 2100. The processing device for supporting a mobile TV may process media data according to the standards of DMB, digital video broadcasting (DVB) or media flow.

Each of the above-mentioned elements of the mobile terminal according to various embodiments of the present disclosure may be configured with one or more components, and the names of the elements may be changed according to the type of the mobile terminal. The mobile terminal according to various embodiments of the present disclosure may include at least one of the above-mentioned elements, and some elements may be omitted or other additional elements may be added.

Furthermore, some of the elements of the mobile terminal according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific integrated circuit (ASIC) chip, a field-programmable gate array (FPGA), or a programmable-logic device for performing some operations, which are known or will be developed.

According to various embodiments of the present disclosure, at least a part of devices (e.g., modules or functions thereof) or methods (e.g., operations) according to various embodiments of the present disclosure may be implemented as instructions stored in a computer-readable storage medium in the form of a programming module. In the case where the instructions are performed by at least one processor, the at least one processor may perform functions corresponding to the instructions. At least a part of the programming module may be implemented (e.g., executed) by a processor. At least a part of the programming module may include, for example, a module, a program, a routine, sets of instructions, or a process for performing at least one function.

The computer-readable storage medium may include a magnetic medium such as a hard disk, a floppy disk and a magnetic tape, an optical medium such as a compact disc ROM (CD-ROM) and a digital versatile disc (DVD), a magneto-optical medium such as a floptical disk, and a hardware device configured to store and execute program instructions (e.g., a programming module), such as a ROM, a RAM, a flash memory, or the like. The program instructions may include machine language codes generated by compilers and high-level language codes that can be executed by computers using interpreters. The above-mentioned hardware may be configured to be operated as one or more software modules for performing operations of various embodiments of the present disclosure and vice versa.

The module or programming module according to various embodiments of the present disclosure may include at least one of the above-mentioned elements, or some elements may be omitted or other additional elements may be added. Operations performed by the module, the programming module or the other elements may be performed in a sequential, parallel, iterative or heuristic way. Furthermore, some operations may be performed in another order or may be omitted, or other operations may be added.

According to various embodiments of the present disclosure, driving of a vehicle application is automatically controlled according to whether a user enters a vehicle, which is determined based on information detected by sensors of a mobile terminal and/or a communication connection of a communication unit, without a command or manipulation by the user for executing the vehicle application, thereby improving user experience and user convenience.

Furthermore, since an in-vehicle position of the user is determined based on the information detected by the sensors provided to the mobile terminal, and a specific function corresponding to the in-vehicle position of the user is provided or restricted, the user convenience and stability may be improved.

Moreover, according to various embodiments of the present disclosure, the execution of the vehicle application is automatically terminated according to whether the user alights from the vehicle, which is determined based on the information detected by the sensors of the mobile terminal and/or the communication connection of the communication unit, thereby improving the user experience and the user convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile terminal supporting a vehicle application, the mobile terminal comprising:
    an acceleration sensor configured to detect a motion of the mobile terminal;
    a magnetic sensor configured to detect a magnetic field; and
    at least one processor,
    wherein the at least one processor is configured to execute a vehicle application in response to:
        detecting a first pre-defined motion pattern of entering the vehicle, and
        detecting at least one of a pre-defined magnetic field value or a first magnetic field change by entering the vehicle, after detecting the first pre-defined motion pattern, and
    wherein the at least one processor is further configured to terminate the vehicle application in response to:
        detecting a second magnetic field change by alighting the vehicle, and
        detecting a second pre-defined motion pattern of alighting the vehicle, after detecting the second magnetic field change.

2. The mobile terminal of claim 1, wherein the at least one processor is further configured to detect at least one of the pre-defined magnetic field value or the first magnetic field change by comparing the detected magnetic field with magnetic field information registered on the vehicle.

3. The mobile terminal of claim 1, wherein the at least one processor is further configured to detect at least one of the pre-defined magnetic field value or the first magnetic field change by comparing the detected magnetic field with magnetic field information provided by a manufacturer of the vehicle.

4. The mobile terminal of claim 1, wherein the at least one processor is further configured to execute a first function and restriction of a second function pre-defined for a user in response to:
    detecting the first pre-defined motion pattern, and
    detecting at least one of the pre-defined magnetic field value or the first magnetic field change, after detecting the first pre-defined motion pattern.

5. The mobile terminal of claim 4, wherein the at least one processor is further configured to determine an in-vehicle position of the mobile terminal based on the detected motion and the detected magnetic field.

6. The mobile terminal of claim 4, wherein the at least one processor is further configured to determine an in-vehicle position of the mobile terminal based on motion information received from another device paired with the mobile terminal.

7. The mobile terminal of claim 5, wherein the at least one processor is further configured to provide a function for a driver or a function for a passenger based on whether the in-vehicle position corresponds to a position of a driver or a position of a passenger.

8. The mobile terminal of claim 1, wherein the at least one processor is further configured to collect and store at least one of location coordinates or altitude information of a time point when the second predefined motion pattern of alighting from the vehicle is detected.

9. The mobile terminal of claim 1, further comprising a microphone configured to detect a noise,
    wherein the at least one processor is further configured to detect at least one of the pre-defined magnetic field value or the first magnetic field change if the noise is detected by the microphone, and
    wherein the at least one processor is further configured to detect the second magnetic field change if the noise is detected by the microphone.

10. The mobile terminal of claim 1,
    wherein the at least one processor includes a sensor hub and an application processor,
    wherein the sensor hub is configured to:
        determine whether the detected motion corresponds to the first predefined motion pattern, and the detected magnetic field corresponds to at least one of the pre-defined magnetic field value or the first magnetic field change, and
        output a signal according to the determination, and
    wherein the application processor is configured to:
        be activated based on the signal output from the sensor hub, and
        execute the vehicle application.

11. The mobile terminal of claim 1,
    wherein the at least one processor includes a sensor hub and an application processor,
    wherein the sensor hub is configured to:
        determine whether the detected magnetic field corresponds to the second magnetic field change, and the detected motion corresponds to the second pre-defined motion pattern, and
        output a signal according to the determination, and
    wherein the application processor is configured to terminate execution of the vehicle application based on the signal output from the sensor hub.

12. A method for controlling a vehicle application in a mobile terminal, the method comprising:
    executing, by at least one processor, a vehicle application in response to:
        detecting, by the at least one processor, a first pre-defined motion pattern of entering the vehicle detected by an acceleration sensor, and
        detecting, by the at least one processor, at least one of a predefined magnetic field value or a first magnetic field change by entering the vehicle detected by a magnetic sensor, after detecting the first pre-defined motion pattern, and
    terminating, by the at least one processor, the vehicle application in response to:
        detecting, by the at least one processor, a second magnetic field change by alighting the vehicle, and
        detecting, by the at least one processor, a second pre-defined motion pattern of alighting the vehicle, after detecting the second magnetic field change.

13. The method of claim 12,
    wherein the at least one processor is configured to detect at least one of the pre-defined magnetic field value or the first magnetic field change if a noise is detected by a microphone, and
    wherein the at least one processor is further configured to detect the second magnetic field change if the noise is detected by the microphone.

14. The method of claim 12,
    wherein the at least one processor is further configured to detect at least one of the pre-defined magnetic field value or the first magnetic field change if a vibration is detected by an inertia sensor, and
    wherein the at least one processor is further configured to detect the second magnetic field change if a vibration is detected by an inertia sensor.

15. The method of claim 12, further comprising:
registering magnetic field information on the vehicle of the user to the mobile terminal,
wherein the at least one processor is further configured to detect at least one of the pre-defined magnetic field value or the first magnetic field by comparing a detected magnetic field with the registered magnetic field information.

16. The method of claim 12, wherein the at least one processor is further configured to detect at least one of the pre-defined magnetic field value or the first magnetic field by comparing the detected magnetic field with magnetic field information provided by a manufacturer, which is stored on the mobile terminal.

17. The method of claim 12, further comprising performing, by the at least one processor, at least one of execution of a first function or restriction of a second function pre-defined for the user.

18. The method of claim 12, further comprising:
determining, by the at least one processor, an in-vehicle position of the mobile terminal based on information received from at least one sensor or another device, and
providing, by the at least one processor, a function corresponding to the in-vehicle position of the mobile terminal.

* * * * *